US009888517B2

United States Patent
Tsubouchi

(10) Patent No.: US 9,888,517 B2
(45) Date of Patent: Feb. 6, 2018

(54) SYSTEM FOR WIRELESS COMMUNICATION AND APPARATUS FOR WIRELESS COMMUNICATION

(71) Applicant: FUJITSU LIMITED, Kawasaki-shi, Kanagawa (JP)

(72) Inventor: Koji Tsubouchi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 14/559,596

(22) Filed: Dec. 3, 2014

(65) Prior Publication Data

US 2015/0163090 A1 Jun. 11, 2015

(30) Foreign Application Priority Data

Dec. 11, 2013 (JP) ................................. 2013-256398

(51) Int. Cl.
*H04W 4/00* (2009.01)
*H04W 76/04* (2009.01)
*H04L 12/24* (2006.01)
*H04W 28/10* (2009.01)
*H04L 12/26* (2006.01)

(52) U.S. Cl.
CPC ....... *H04W 76/041* (2013.01); *H04L 41/0659* (2013.01); *H04L 43/0817* (2013.01); *H04W 28/10* (2013.01)

(58) Field of Classification Search
None
See application file for complete search history.

(56) References Cited

U.S. PATENT DOCUMENTS

| 8,903,453 | B2 * | 12/2014 | Ogura | 370/328 |
| 2004/0009773 | A1 * | 1/2004 | Kato | H04L 47/10 |
| | | | | 455/445 |
| 2004/0121805 | A1 * | 6/2004 | Kikuchi | H04L 12/24 |
| | | | | 455/560 |
| 2004/0151166 | A1 * | 8/2004 | Tsukagoshi | H04L 12/5695 |
| | | | | 370/352 |

(Continued)

FOREIGN PATENT DOCUMENTS

| GB | 2 412 548 A | 9/2005 |
| JP | 2004-048209 A | 2/2004 |

(Continued)

OTHER PUBLICATIONS

"3rd Generation Partnership Project; Technical Specification Group Core Network and Terminals; Restoration Procedures (Release 12)." 3GPP TS 23.007, V12.2.1, pp. 1-80, 2013.

(Continued)

*Primary Examiner* — Bob Phunkulh
(74) *Attorney, Agent, or Firm* — Arent Fox LLP

(57) ABSTRACT

A system for wireless communication including: a first communication apparatus including a plurality of user plane processors, each user plane processor of the plurality of user plane processors being configured to forward data associated with a session that is associated with the user plane processor, to a terminal or from the terminal, and a control plane processor configured to transfer, when a first user plane processor is unavailable, the session that has been associated with the first user plane processor to a second user plane processor that is available.

11 Claims, 26 Drawing Sheets

(56) References Cited

U.S. PATENT DOCUMENTS

| | | | |
|---|---|---|---|
| 2006/0033746 A1 | 2/2006 | Ogura | |
| 2006/0056333 A1* | 3/2006 | Ogura | H04W 88/12 370/328 |
| 2007/0015540 A1* | 1/2007 | Sakata | H04W 88/12 455/560 |
| 2008/0214189 A1* | 9/2008 | Taaghol | H04L 69/08 455/432.2 |
| 2008/0248804 A1* | 10/2008 | Al-Bakri | H04W 76/025 455/450 |
| 2009/0070484 A1* | 3/2009 | Ewert | H04L 29/06027 709/236 |
| 2010/0061226 A1* | 3/2010 | Morishige | H04L 12/66 370/216 |
| 2011/0044251 A1* | 2/2011 | Tamura | H04W 36/32 370/328 |
| 2011/0176407 A1* | 7/2011 | Campbell | H04W 76/064 370/216 |
| 2012/0172066 A1 | 7/2012 | Okabe et al. | |
| 2012/0231796 A1* | 9/2012 | Meylan | H04W 36/0055 455/436 |
| 2015/0195202 A1* | 7/2015 | Ogura | H04M 3/00 370/236 |

FOREIGN PATENT DOCUMENTS

| | | |
|---|---|---|
| JP | 2005-252502 A | 9/2005 |
| JP | 2005-348391 A | 12/2005 |
| JP | 2012-065367 A | 3/2012 |

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-UTRAN) Access (Release 12)." 3GPP TS 23.401, V12.2.0, pp. 1-293, 2013.

\* cited by examiner

FIG. 6

| TERMINAL ADDRESS Address | SGW CP Address | SGW UP Address | ... |
|---|---|---|---|
| UE#1 | CP#1 | UP#1 | ... |
| UE#2 | CP#1 | UP#2 | ... |
| UE#3 | CP#2 | UP#3 | ... |
| ... | ... | ... | ... |

FIG. 7

| SGW CP Address | CP ADDRESS FAILURE CONDITION | UP ADDRESS FAILURE CONDITION |
|---|---|---|
| CP#1 | NORMAL | UP #1: FAILED, UP #2: NORMAL |
| CP#2 | NORMAL | UP #1: FAILED, UP #2: NORMAL |
| ... | ... | ... |

FIG. 9

| TERMINAL ADDRESS | SGW CP Address | ... |
|---|---|---|
| UE#1 | CP#1 | ... |
| UE#2 | CP#1 | ... |
| UE#3 | CP#2 | ... |
| ... | ... | ... |

FIG. 10

| SGW CP Address | SGW UP FAILURE CONDITION |
|---|---|
| CP#1 | PARTIAL FAILURE |
| CP#2 | NORMAL |
| ... | ... |

SYSTEM FOR WIRELESS COMMUNICATION AND APPARATUS FOR WIRELESS COMMUNICATION

CROSS-REFERENCE TO RELATED APPLICATION

This application is based upon and claims the benefit of priority of the prior Japanese Patent Application No. 2013-256398, filed on Dec. 11, 2013, the entire contents of which are incorporated herein by reference.

FIELD

The embodiments discussed herein relate to a system for wireless communication and an apparatus for wireless communication.

BACKGROUND

A plurality of wireless access systems are in use at the present time. 3GPP TS23.401 V12.2.0 and 3GPP TS23.007 V12.2.1, Section 27 pertaining, for example, to a core network called Evolved Packet Core (EPC) in the 3rd Generation Partnership Project (3GPP) have been standardized as technologies for aggregating the plurality of wireless access systems. For example, as illustrated in FIG. 1, a 3G network such as W-CDMA and a LET network are aggregated in an EPC. The EPC includes a PDN gateway (PGW), a serving gateway (SGW), and a mobility management entity (MME) as network devices. FIG. 1 is a view for explaining Evolved Packet Core (EPC). The communication system illustrated in FIG. 1 includes a serving GPRS support node (SGSN) and a radio network controller (RNC) as a 3G network.

The SGW is mainly a gateway for handling user data. As illustrated in FIG. 2 for example, the SGW has a plurality of user plane (U-plane) processing units that use a "communication tunnel" to which user terminal "sessions" are assigned, and a control plane (C-plane) processing unit for managing the communication tunnels. The control plane processing unit sends and receives signals for managing quality of service (QoS) and for following the movements of the users. FIG. 2 is a view of a configuration example of a serving gateway (SGW). A "communication tunnel" is a logical communication path provided between user plane processing units and base stations. The user plane processing units are associated with one or a plurality of communication tunnels. A "session" is information held in the EPC for connecting a user terminal to a public data communication network (PDN), and includes, for example, user terminal IDs and position information of user terminals. Moreover, "setting (establishing) a session" signifies associating a communication tunnel with a session. By setting (establishing) a session, the transfer of user data using a communication tunnel is made possible since the user terminal and the communication tunnel are associated with each other. In FIG. 1, the dotted lines signify a control plane and the solid lines signify a user plane. The ovals #a and #b in FIG. 2 indicate the respective sessions of user terminals #a and #b. Therefore, the session #a of the user terminal #a is established in the user plane processing unit in a blade #1, and the session #b of the user terminal #b is established in the user plane processing unit in a blade #2.

The MME cooperates with the control plane processing unit to control switching of the communication tunnels used for the user terminal communication. The PGW transfers user data between the SWG and an external network (for example, PDN).

Conventionally, the PGW monitors each SGW for defects (failures) in the SGWs. When user data addressed to a first user terminal is received from the external network, the PGW determines whether any defects are present in a first SGW in which the session with the first user terminal is established. If a defect is present, the PGW transmits a "user data notification" to the MME via a second SGW different from the first SGW, and the MME establishes a session with the first user terminal with another SGW other than the first SGW. As a result, even if a SGW in which a session is established has a defect, the user data can be transferred to the user terminal address.

SUMMARY

According to an aspect of the invention, a system for wireless communication includes a first communication apparatus including a plurality of user plane processors, each user plane processor of the plurality of user plane processors being configured to forward data associated with a session that is associated with the user plane processor, to a terminal or from the terminal, and a control plane processor configured to transfer, when a first user plane processor is unavailable, the session that has been associated with the first user plane processor to a second user plane processor that is available.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a session information management table;

FIG. 7 illustrates an example of a failure management table;

FIG. 9 illustrates an example of a session information management table;

FIG. 10 illustrates an example of a failure management table;

DESCRIPTION OF EMBODIMENTS

Figure 1:
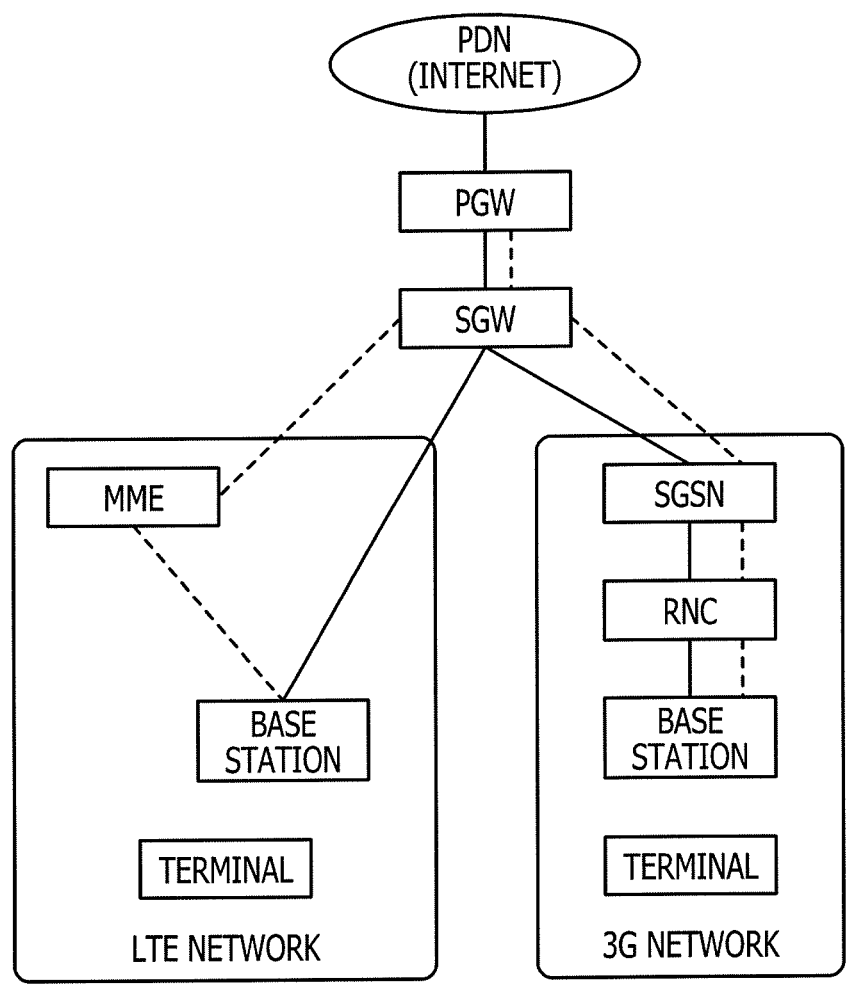
FIG. 1 is a view for explaining EPC.
Figure 2:
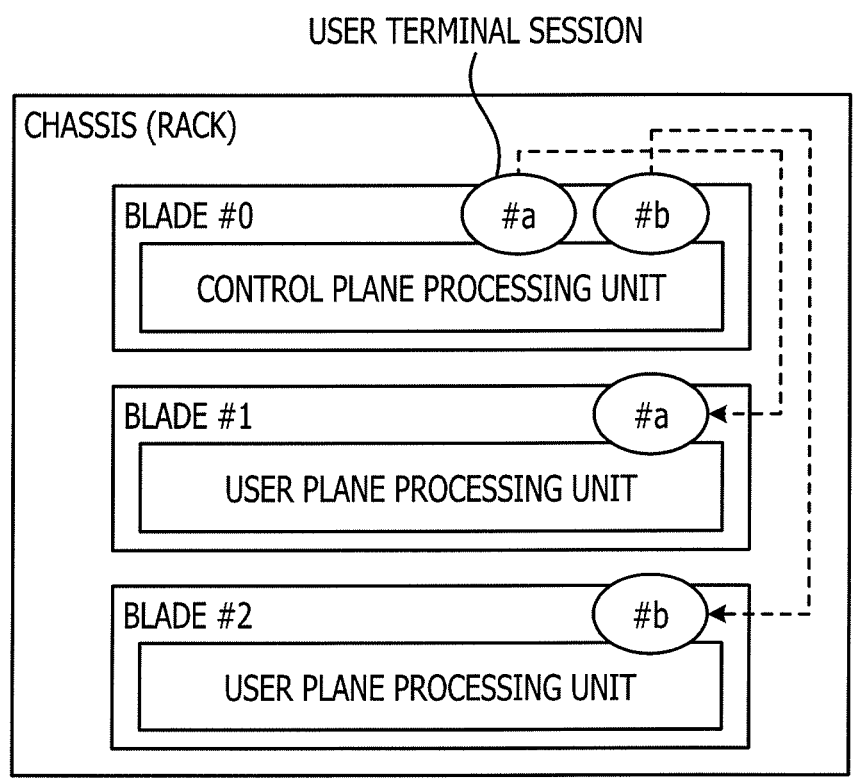
FIG. 2 illustrates an example of a SGW configuration.

However, with the above prior art, even if defects occur, for example, in a portion of the plurality of user plane processing units included in the SGW, all of the sessions established in that SGW are established in another SGW. Therefore, sessions which are established in a user plane processing unit without a defect to allow for the transfer of user data are established in another SGW. That is, a session corresponding to one user terminal is established in a plurality of SGWs and thus resources (for example, a communication tunnel) are wasted.

A technique discussed herein considers the above problem and aims to provide a communication system and a network device that are capable of improving the utilization efficiency of resources.

Embodiments of the communication system and network devices discussed herein are described with reference to the accompanying drawings. The communication system and network devices discussed herein are not limited to the embodiments. Moreover, the same reference numerals are applied to configurations having the same functions in the embodiments and explanations thereof are omitted. Moreover, the same reference numerals are applied to similar processing steps in the embodiments and explanations thereof are omitted.

(First Embodiment)

(Outline of Communication System)

Figure 3:
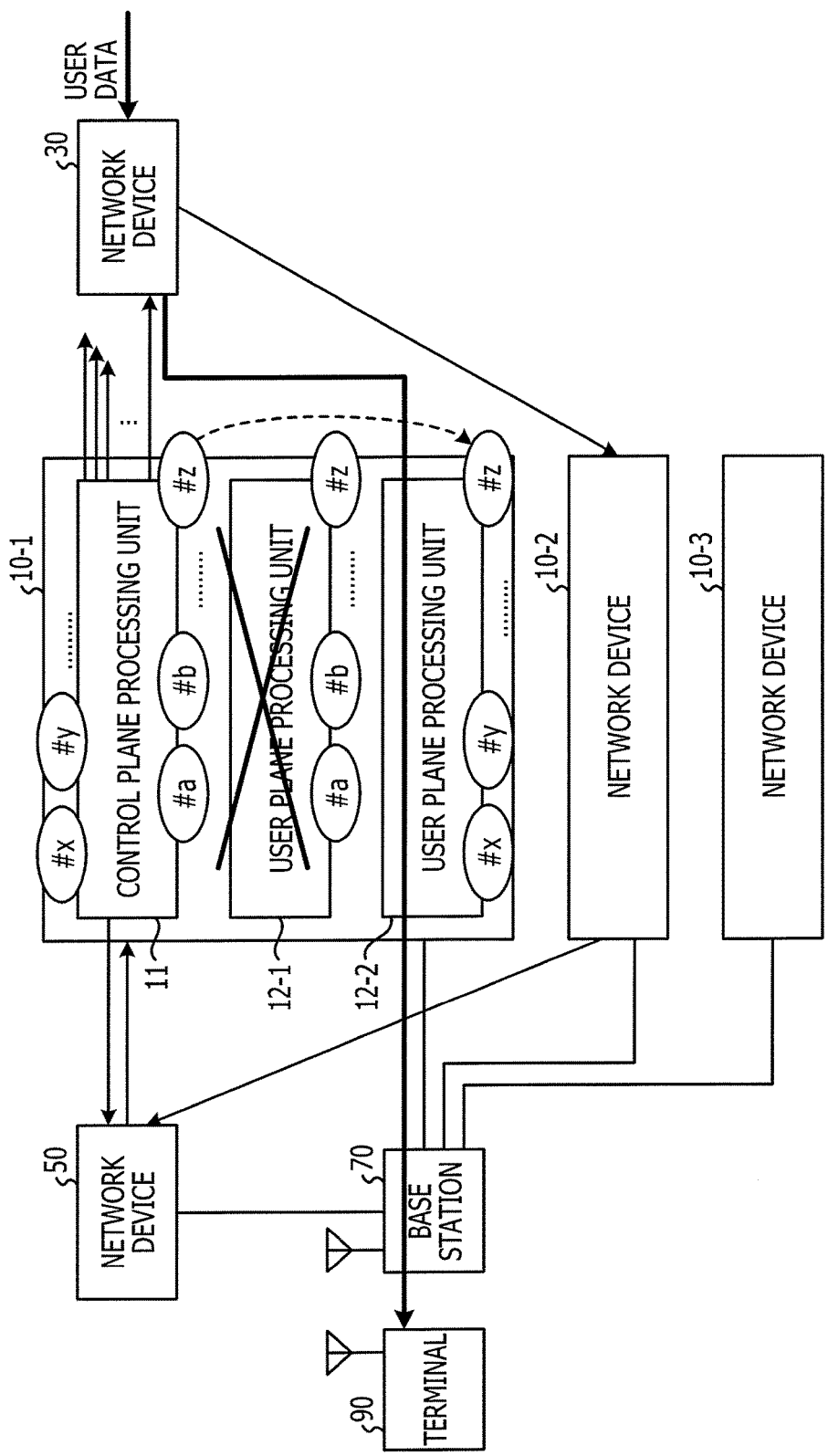
FIG. 3 is an example of a communication system of a first embodiment.

FIG. 3 is an example of a communication system of a first embodiment. A communication system 1 illustrated in FIG. 3 has network devices 10-1, 10-2, 10-3, a network device 30, a network device 50, a base station 70, and a user terminal 90. The network device 10 is for example a SGW, the network device 30 is for example a PGW, and the network device 50 is for example a MME or a SGSN. While the number of network devices 10 is three, the number of network devices 30 is one, the number of one network devices 50 is one, and the number of base stations 70 and user terminals 90 is one each in FIG. 3, the number of each of the constituents is not limited. The network device 10 may be referred to as a "first network device", the network device 30 may be referred to as a "second network device", and the network device 50 may be referred to as a "third network device" hereinbelow.

The network device 10-1 in FIG. 3 has a control plane processing unit 11 and user plane processing units 12-1 and 12-2. The number of user plane processing units 12 is two in this case, but the number is not limited to two. The network devices 10-2 and 10-3 have the same configuration as the network device 10-1. The control plane processing unit 11 manages sessions and communication tunnels. The user plane processing units 12-1 and 12-2 use the communication tunnel to which a session with a user terminal is assigned to transfer user data. The control plane processing unit 11 in FIG. 3 manages sessions #a, #b, #x, #y, #z, and the like. The sessions #a, #b, and #z are set (established) in the user plane processing unit 12-1, and the sessions #x and #y are established in the user plane processing unit 12-2. It is assumed herein that the user plane processing unit 12-1 has a defect. In this case, the control plane processing unit 11 transmits to the network device 50 a "partial failure notification" indicating that there is a defect in one portion of the processing units of the network device 10-1.

The network device 30 monitors in units of processing units whether any defects are present in the control plane processing unit 11 and in the plurality of user plane processing units 12 in the network devices 10. Therefore, the network device 30 has state information that indicates whether there is a defect in the user plane processing unit 12-1 in the network device 10-1. When user data addressed to a user terminal 90 is received from an external network, the network device 30 determines whether a defect is present in the user plane processing unit 12 in which a session with the user terminal 90 is established. If there is no defect in the user plane processing unit 12 in which the session with the user terminal 90 is established, the network device 30 transfers the user data to that user plane processing unit 12. That is, if the session of the user terminal 90 were the session #x, the network device 30 would transfer the user data to the user plane processing unit 12-2.

As described above, when the network device 30 receives data addressed to the user terminal 90 corresponding to a session established in the user plane processing unit 12 that has no defect, the network device 30 transfers the data to that user plane processing unit 12. As a result, no session is established wastefully in, for example, the network device 10-2, and the wasteful use of resources can be reduced since an available session is used. That is, the utilization efficiency of the resources can be improved.

Conversely, if the user plane processing unit 12 in which the session with the user terminal 90 is established has a defect, the network device 30 transmits a "user data notification" to the network device 50 through a network device 10 other than the network device 10-1 (for example, the network device 10-2).

When the network device 50 receives the partial failure notification from the network device 10-1 and receives the user data notification through the network device 10 other than the network device 10-1, the network device 50 then transmits a "change request" for the session of the user terminal 90 to the network device 10-1.

Upon receiving the "change request" for the session of the user terminal 90, the control plane processing unit 11 of the network device 10-1 establishes a session of the user terminal 90 with the user plane processing unit 12-2 that is different from the user plane processing unit 12-1 and that does not have a defect.

As described above, the network device 50 transmits the session change request to the network device 10-1 in place of a request to establish a session in a network device 10 other than the network device 10-1. Upon receiving the change request, the control plane processing unit 11 establishes a session. As a result, no wasteful session is established in, for example, the network device 10-2, and a session can be established in a user plane processing unit 12 without a defect within the network device 10-1. Therefore, a wasteful use of resources can be reduced since the establishment of the same session with the user terminal 90 is not duplicated in a plurality of network devices 10. That is, the utilization efficiency of the resources can be improved.

When the network device 50 receives a "total failure notification" that indicates defects in all of the processing units in the network device 10-1 and receives the user data notification through a network device 10 other than the network device 10-1, the network device 50 transmits a "session creation request" to a network device 10 other than the network device 10-1.

(Configuration Example of First Network Device)

Figure 4:
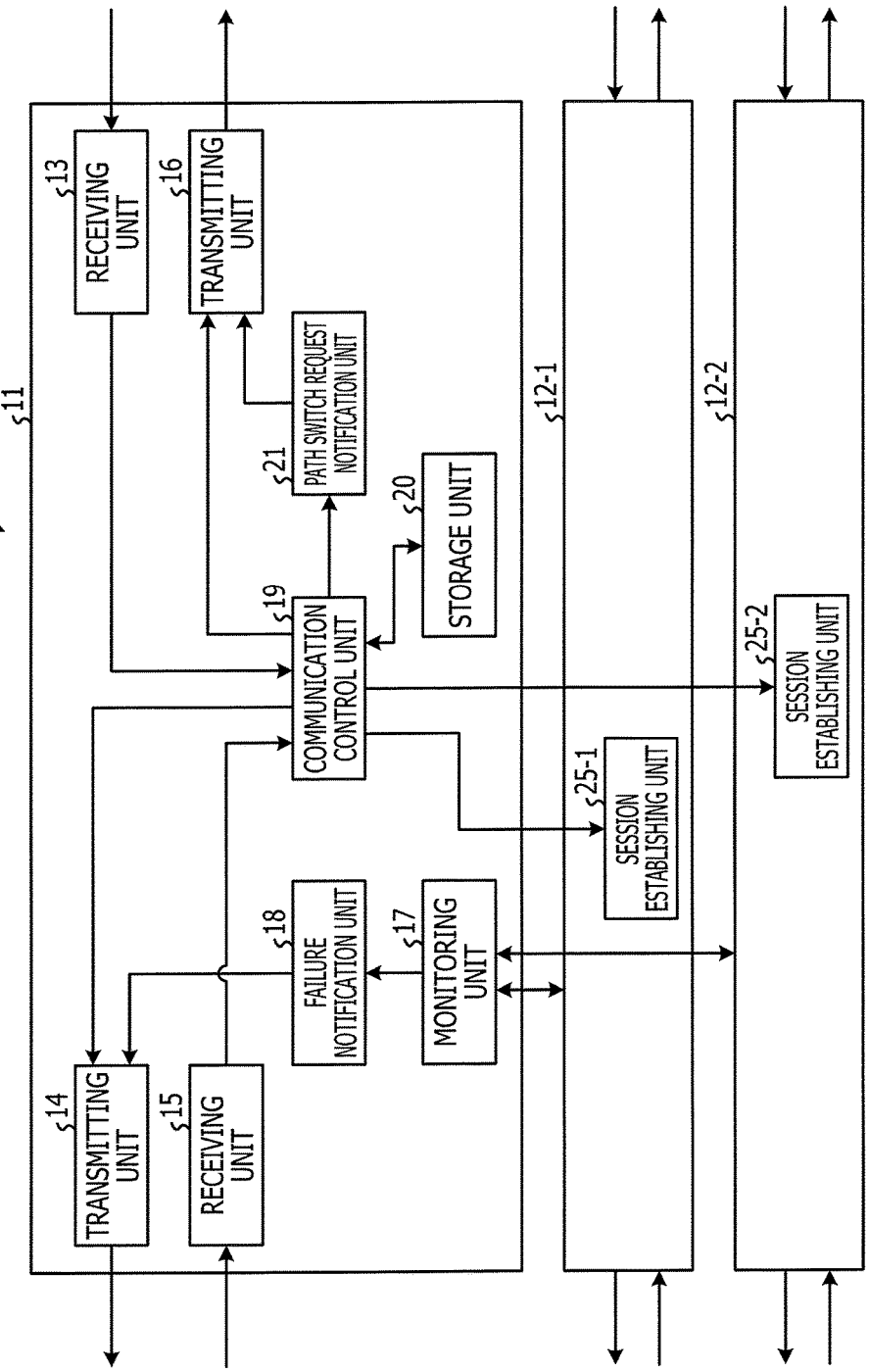
FIG. 4 is a block diagram of an example of a first network device of the first embodiment.

FIG. 4 is a block diagram of an example of a first network device of the first embodiment. The network device 10 in FIG. 4 has a control plane processing unit 11 and user plane processing units 12-1 and 12-2. The control plane processing unit 11 has receiving units 13 and 15, transmitting units 14 and 16, a monitoring unit 17, a failure notification unit 18, a communication control unit 19, a storage unit 20, and a path switch request notification unit 21. The user plane processing unit 12 has a session establishing unit 25.

The receiving unit 13 receives signals transmitted by the network device 30 and outputs the received signals to the communication control unit 19. The received signals include the aforementioned user data notifications.

The monitoring unit 17 monitors whether any defects are present in the user plane processing units 12 and outputs the monitoring results to the failure notification unit 18. For example, the monitoring unit 17 outputs test data to the user plane processing units 12 and monitors defects in the user plane processing units 12 based on whether response signals from the user plane processing units 12 are present or not or are correct or not.

The failure notification unit 18 creates the aforementioned partial failure notification and transmits the partial failure notification to the network device 50 through the transmitting unit 14 when the monitoring result from the monitoring unit 17 indicates that a defect is present in a portion of the plurality of user plane processing units 12. The failure notification unit 18 creates the aforementioned total failure notification and transmits the total failure notification to the network device 50 through the transmitting unit 14 when the monitoring result from the monitoring unit 17 indicates that defects are present in all of the plurality of user plane processing units 12.

The transmitting unit 14 transmits transmission signals to the network device 50. The transmission signals include user data notifications received from the communication control unit 19 and partial failure notifications or total failure notifications received from the failure notification unit 18.

The receiving unit 15 receives signals transmitted by the network device 50 and outputs the received signals to the communication control unit 19. The received signals may include the aforementioned change requests.

Upon receiving a user data notification, the communication control unit 19 transmits the user data notification to the network device 50 through the transmitting unit 14. The above processing is conducted when the network device 10 is the network device 10-2 described with reference to FIG. 3.

Upon receiving a change request, the communication control unit 19 newly establishes (moves) the session corresponding to the change request to another user plane processing unit 12 that is different from the user plane processing unit 12 in which the session is currently established. For example, when a change request for a session established in the user plane processing unit 12-1 having a defect is received, the communication control unit 19 outputs an "establishment command" pertaining to the session to a session establishing unit 25-2 in the user plane processing unit 12-2 that does not have a defect. Information about the session corresponding to the change request is included in the establishment command. The communication control unit 19 then copies the correspondence relation of the newly established session and the communication tunnel of the user plane processing unit 12 in a "session correspondence table". The session correspondence table is stored in the storage unit 20. The communication control unit 19 then outputs the correspondence relation of the newly established session and the communication tunnel of the user plane processing unit 12 to the path switch request notification unit 21.

The path switch request notification unit 21 receives the correspondence relation of the newly established session and the communication tunnel of the user plane processing unit 12 from the communication control unit 19, and then creates a "switch request notification" including the correspondence relation and transmits the switch request notification to the network device 30 through the transmitting unit 16. Due to the network device 30 receiving the switch request notification, the network device 30 is able to transfer the user data addressed to the user terminal 90 corresponding to the newly established session to the user plane processing unit 12 in which the session is established.

The session establishing unit 25 establishes sessions according to the establishment commands received from the communication control unit 19. That is, the session establishing unit 25 establishes a session by associating the information of the session included in the establishment command with a communication tunnel.

The transmitting unit 16 transmits transmission signals to the network device 30. The transmission signals may include the aforementioned switch request notifications.

(Configuration Example of Second Network Device)

Figure 5:
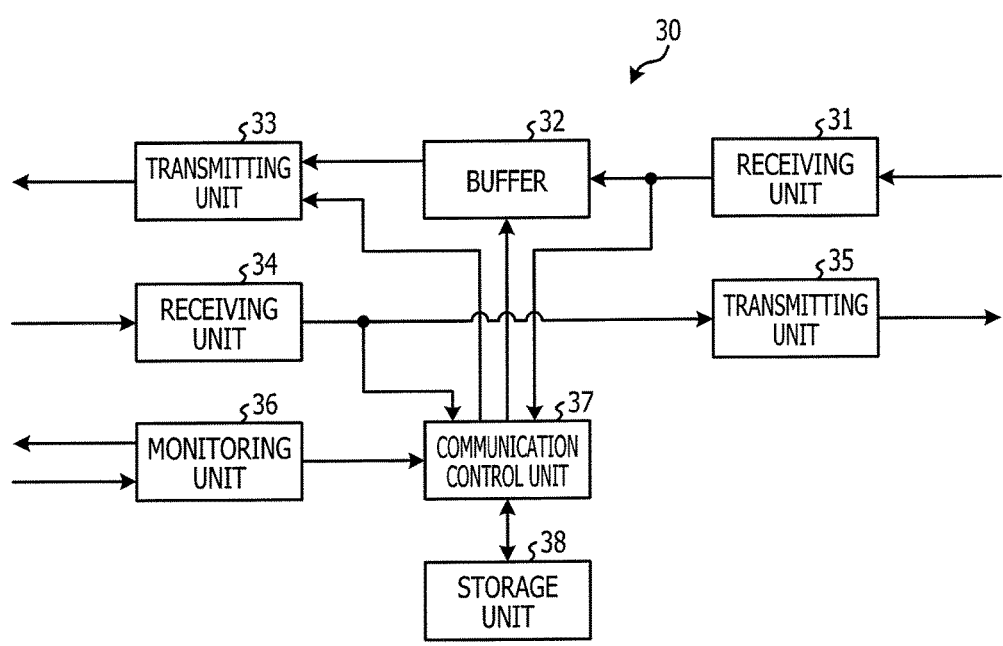
FIG. 5 is a block diagram of an example of a second network device of the first embodiment.

FIG. 5 is a block diagram of an example of a second network device of the first embodiment. The network device 30 in FIG. 5 includes receiving units 31 and 34, a buffer 32, transmitting units 33 and 35, a monitoring unit 36, a communication control unit 37, and a storage unit 38.

The monitoring unit 36 monitors in units of processing units whether any defects are present in the control plane processing unit 11 and in the plurality of user plane processing units 12 in the network device 10. For example, the monitoring unit transmits test data to the control plane processing unit 11 and all the plurality of user plane processing units 12 in the network device 10 and determines that a defect is present when response signals corresponding to the test data are not received during a fixed time period or are not received a fixed number of times. The transmission of the test data and the reception of the response signals is conducted using a control plane protocol (for example, GTPv2-C) or a user plane protocol (for example, GTPv1-U) of the network device 10. The monitoring unit 36 then outputs the monitoring result to the communication control unit 37.

The receiving unit 31 receives user data from an external network and outputs the user data to the buffer 32 and the communication control unit 37.

Upon receiving the user data from the receiving unit 31, the communication control unit 37 specifies the user plane processing unit 12 in which the session with the user terminal 90 is established based on identification information (for example, an address) of the user terminal 90 that is the destination of the user data and on a "session information management table". The communication control unit 37 then determines whether or not the specified user plane processing unit 12 is in a failed state based on the specified user plane processing unit 12 and a "failure management table".

If the specified user plane processing unit 12 is not in a failed state, the communication control unit 37 outputs to the buffer 32 a "transmission command" to transmit the user data to the user plane processing unit 12.

Conversely, if the specified user plane processing unit 12 is in a failed state, the communication control unit 37 creates the aforementioned user data notification. The communication control unit 37 then outputs the created user data notification to the transmitting unit 33, and the user data notification is transmitted to the network device 50 through a network device 10 other than the network device 10 in which the session corresponding to the user terminal 90 that is the destination of the user data is established. That is, the communication control unit 37 transmits the user data notification to the network device 50 through another network device 10 that has not failed. As a result, the network device 50 is able to transmit the change request to the network device 10. Upon receiving the switch request notification transmitted from the network device 10 as a result of a session being established based on the change request, the communication control unit 37 outputs to the buffer 32 the transmission command to transmit the user data to the user plane processing unit 12 indicated in the switch request notification. The communication control unit 37 also updates the session information management table based on the switch request notification. For example, the communication control unit 37 updates the address of the user plane processing unit 12 in which the session with the user terminal 90 related to the path switch is established, the address of the control plane processing unit 11, and a communication tunnel ID on the network device 10 side.

The buffer 32 temporarily holds the user data received from the receiving unit 31 and outputs the user data to the transmitting unit 33 in accordance with an output command received from the communication control unit 37.

The storage unit 38 stores the aforementioned "session information management table" and the "failure management table". FIG. 6 illustrates an example of the session information management table. FIG. 7 illustrates an example of the failure management table. The session information management table in FIG. 6 stores the addresses of a plurality of user terminals 90 and correspondence relations between pairs of an address of the control plane processing units 11 and an address of the user plane processing unit 12 corresponding to each user terminal 90 address. The failure management table in FIG. 7 stores the addresses of a plurality of control plane processing units 11, the addresses of the user plane processing units 12 corresponding to the control plane processing units 11, and the states of the plurality of control plane processing units 11 and the plurality of user plane processing units 12 (failed/abnormal state or normal state) in association with each other.

The transmitting unit 33 transmits the information received from the communication control unit 37 and the user data received from the buffer 32.

The receiving unit 34 receives the aforementioned switch request notification and uplink user data. The receiving unit 34 then outputs the switch request notification to the communication control unit 37 and outputs the uplink user data to the transmitting unit 35.

The transmitting unit 35 transmits the uplink user data to an external network.

(Configuration Example of Third Network Device)

Figure 8:
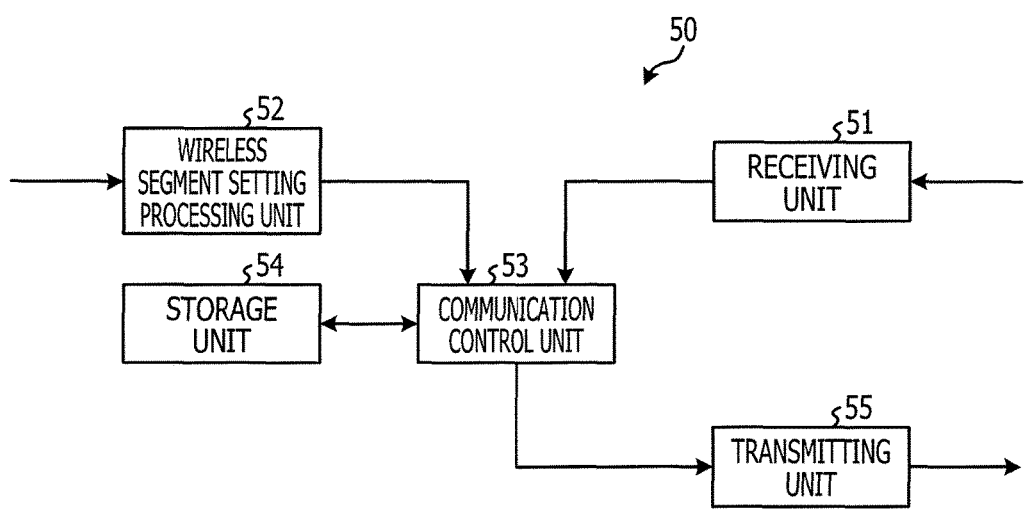
FIG. 8 is a block diagram of an example of a third network device of the first embodiment.

FIG. 8 is a block diagram of an example of a third network device of the first embodiment. The network device 50 in FIG. 8 has a receiving unit 51, a wireless segment setting processing unit 52, a communication control unit 53, a storage unit 54, and a transmitting unit 55.

The receiving unit 51 receives signals transmitted by the network device 10 and signals transmitted by the network device 30, and outputs the received signals to the communication control unit 53. The aforementioned user data notification or the aforementioned partial failure notification or total failure notification may be included in the received signals.

When no wireless segment for the user terminal 90 to transmit uplink user data is set, the wireless segment setting processing unit 52 cooperates with the user terminal 90 and the base station 70 to execute processing (referred to hereinbelow as "wireless segment setting processing") to set the wireless segment. When the wireless segment is set, the wireless segment setting processing unit 52 outputs a "wireless segment setting report" to the communication control unit 53.

Upon receiving the partial failure notification and the user data notification, the communication control unit 53 transmits the "change request" for the session with the user terminal 90 to the network device 10. For example, the communication control unit 53 specifies the control plane processing unit 11 corresponding to the user terminal 90 based on identification information (for example, an address) of the user terminal 90 included in the user data notification and based on the "session information management table". The communication control unit 53 then determines whether a failure is present in the user plane processing unit 12 that manages the specified control plane processing unit 11 based on the specified control plane processing unit 11 and the "failure management table". When a partial failure is present in the user plane processing unit 12 that manages the specified control plane processing unit 11, the communication control unit 53 then transmits the "change request" for the session with the user terminal 90 to the network device 10.

Upon receiving the partial failure notification and the wireless segment setting report, the communication control unit 53 transmits the "change request" for the session with the user terminal 90 having the set wireless segment to the network device 10. For example, the communication control unit 53 specifies the control plane processing unit 11 corresponding to the user terminal 90 based on identification information (for example, an address) of the user terminal 90 included in the wireless segment setting report and based on the "session information management table". The communication control unit 53 then determines whether a failure is present in the user plane processing unit 12 that manages the specified control plane processing unit 11 based on the specified control plane processing unit 11 and the "failure management table". When a partial failure is present in the user plane processing unit 12 that manages the specified control plane processing unit 11, the communication control unit 53 then transmits the "change request" for the session with the user terminal 90 to the network device 10.

The storage unit 54 stores the aforementioned "session information management table" and the "failure management table". FIG. 9 illustrates an example of the session information management table. FIG. 10 illustrates an example of the failure management table. The session information management table in FIG. 9 stores the addresses of a plurality of user terminals 90 and correspondence relations between addresses of the control plane processing units 11 corresponding to the user terminal 90 addresses. The failure management table in FIG. 10 stores the addresses of a plurality of control plane processing units 11, and the states (partial failed state or normal state) of the user plane processing units 12 corresponding to the control plane processing units 11 in association with each other.

The transmitting unit 55 transmits the change request received from the communication control unit 53 to the network device 10.

(Operation Example of Communication System)

Figure 11:
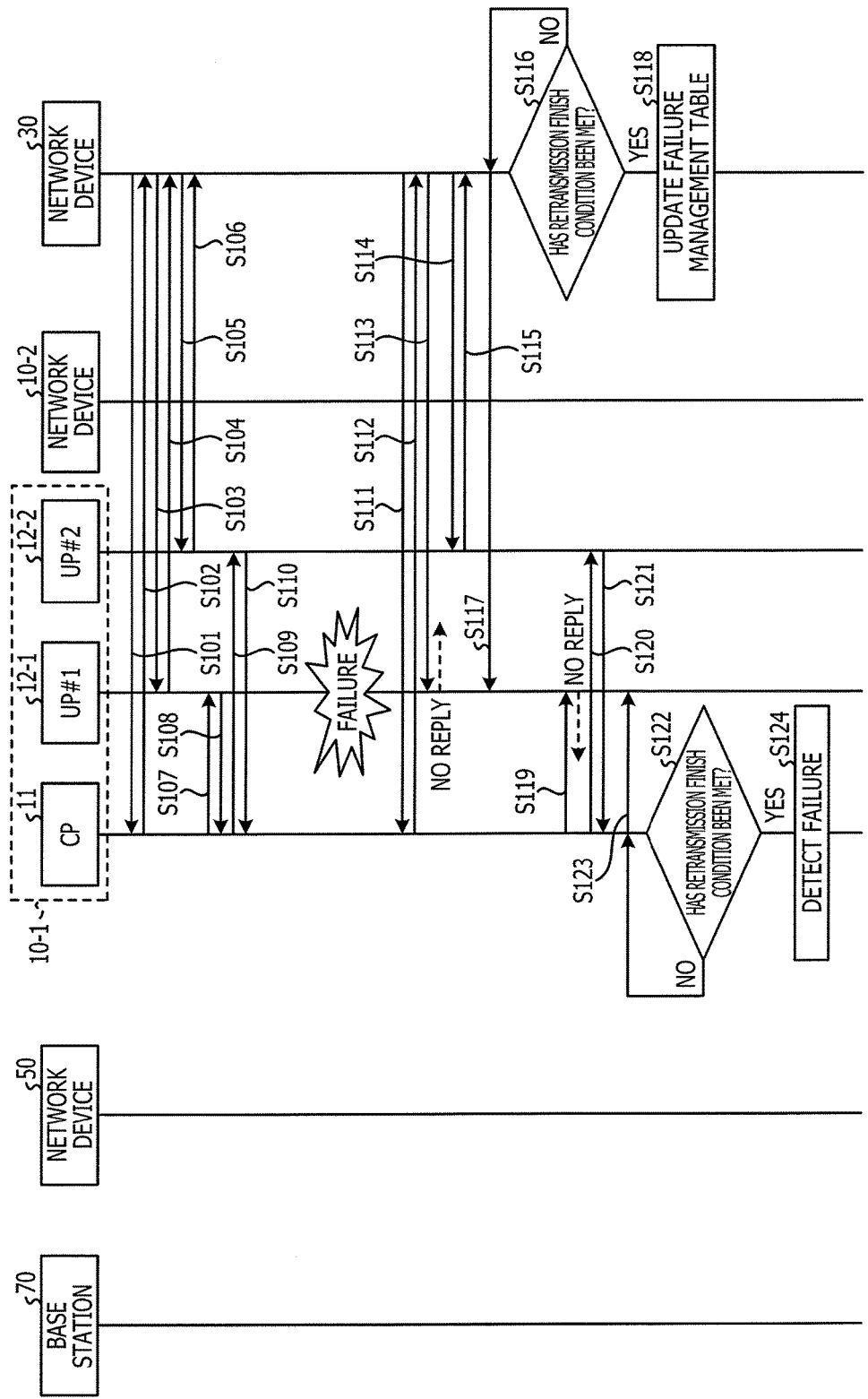
FIG. 11 is an example for explaining processing operations of a communication system of the first embodiment.
Figure 12:
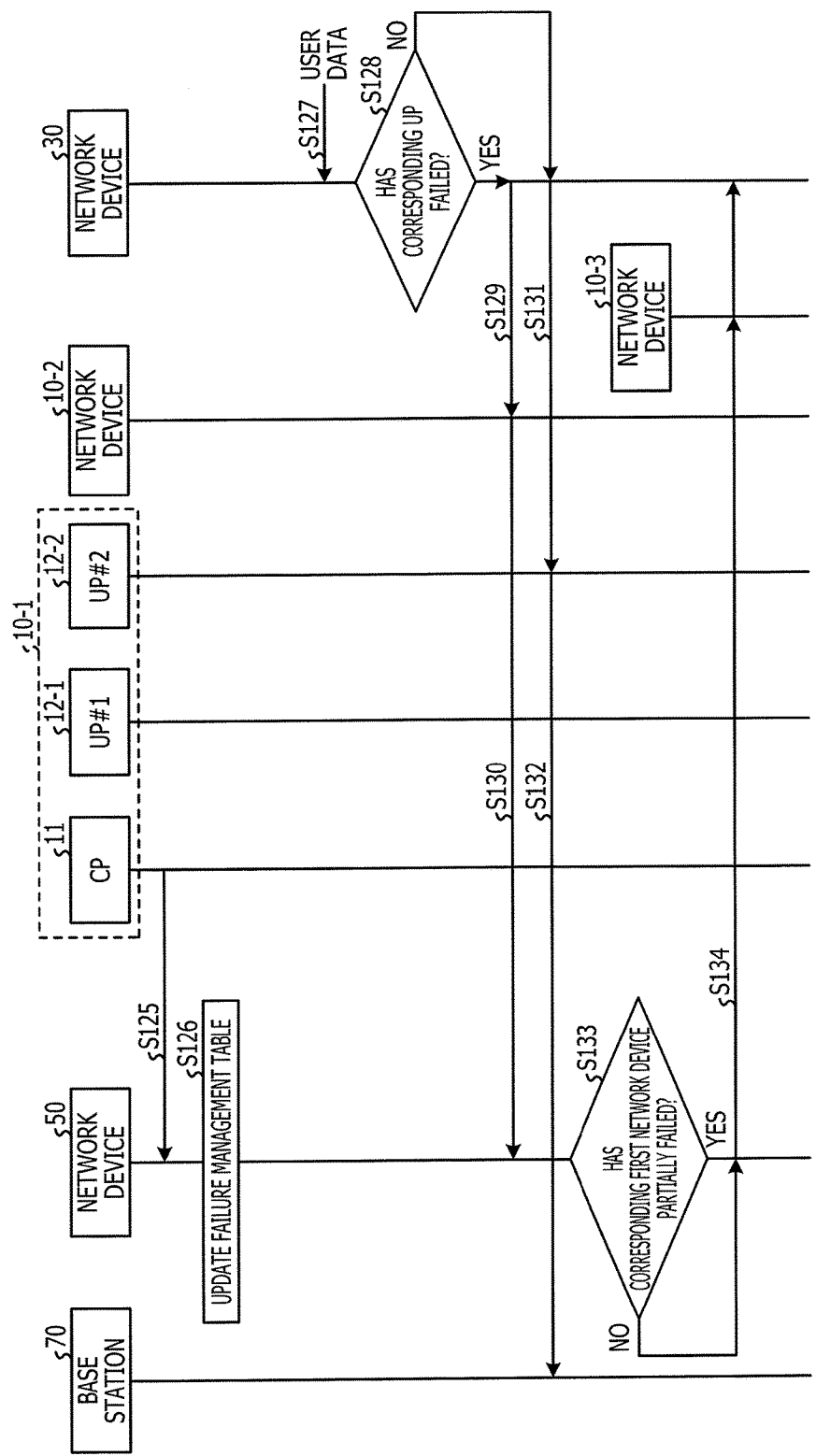
FIG. 12 illustrates processing continued from FIG. 11.
Figure 13:
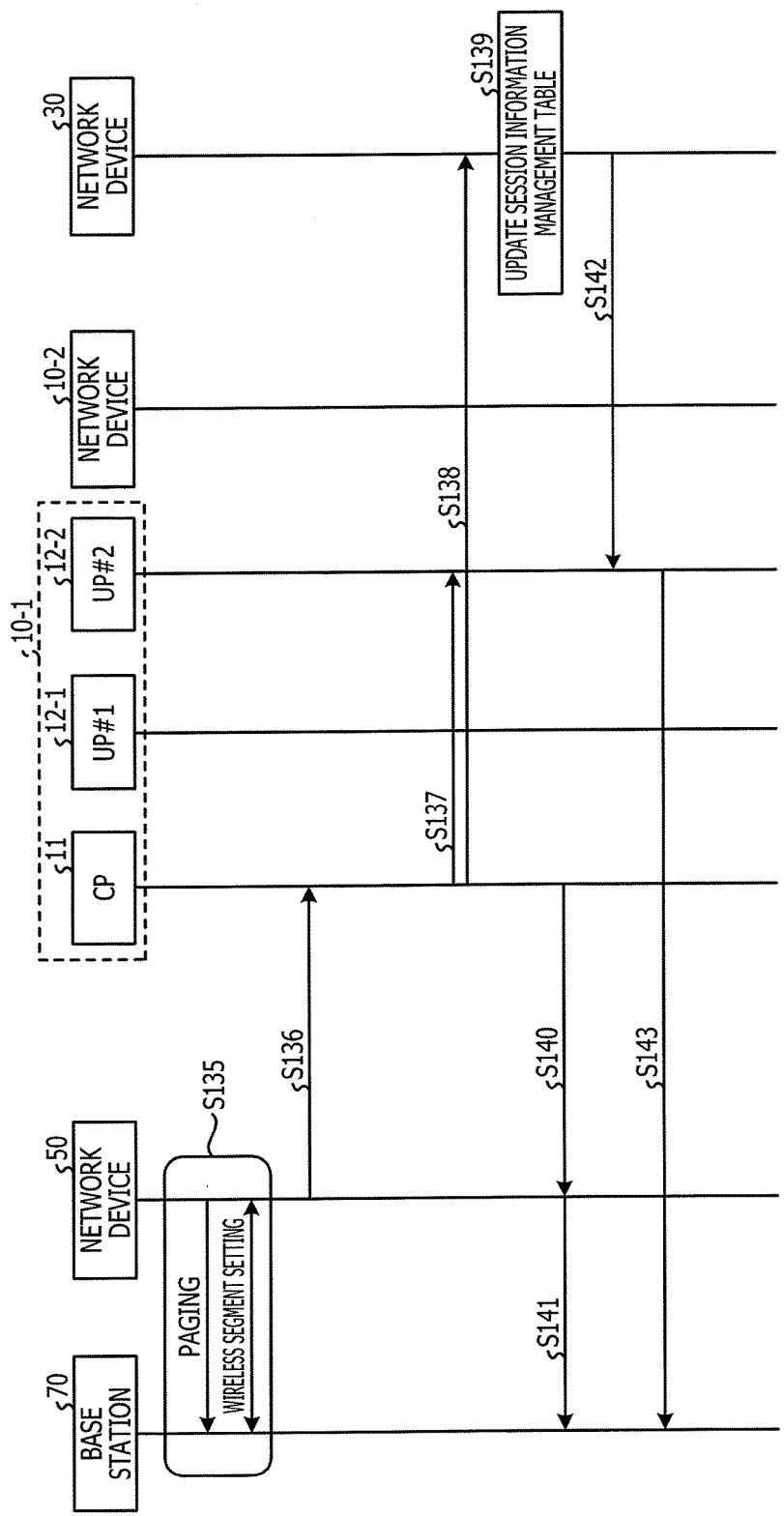
FIG. 13 illustrates processing continued from FIG. 12.

An example of processing operations in the communication system 1 having the above configurations is described below. FIG. 11 is an example for explaining processing operations of a communication system of the first embodiment. FIG. 12 illustrates processing continued from FIG. 11. FIG. 13 illustrates processing continued from FIG. 12.

(Transferring Downlink User Data)

The monitoring unit 36 in the network device 30 transmits test data to the control plane processing unit 11 in the network device 10-1 (step S101). Consequently, the control plane processing unit 11 in the network device 10-1 transmits a response signal pertaining to the test data to the monitoring unit 36 in the network device 30 if the state is normal (step S102). The transmission of the test data and the transmission of the response signals are conducted between the monitoring unit 36 and the user plane processing units 12-1 and 12-2 of the network device 10-1 in the same way (steps S103 to S106). The monitoring unit 36 receives normal response signals since all of the control plane processing unit 11 and the user plane processing units 12-1 and 12-2 are normal. The network device 30 executes the monitoring processing by transmitting test data to the network devices 10-2 and 10-3.

The control plane processing unit 11 in the network device 10-1 outputs test data to the user plane processing unit 12-1 (step S107). Consequently, the user plane processing unit 12-1 outputs to the control plane processing unit 11 the response signal pertaining to the test data if the state is normal (step S108). The output of the test data and the output of the response signals is conducted in the same way between the control plane processing unit 11 and the user plane processing unit 12-2 (steps S109 and S110). The monitoring unit 17 in the control plane processing unit 11 receives normal response signals since the user plane processing units 12-1 and 12-2 are normal. The monitoring processing inside the network device 10 is also conducted in the network devices 10-2 and 10-3.

At this time, it is assumed that a defect such as a failure occurs in the user plane processing unit 12-1.

When a fixed period of time has elapsed after the timing of the completion of a previous monitoring processing period, the monitoring unit 36 in the network device 30 transmits the test data to the control plane processing unit 11 and the user plane processing units 12-1 and 12-2 of the network device 10-1 (steps S111, S113, S114).

Consequently, the control plane processing unit 11 and the user plane processing unit 12-2 of the network device 10-1 each transmit response signals to the monitoring unit 36 of the network device 30 (steps S112, S115). Since a defect has occurred in the user plane processing unit 12-1 as described above, no response signal is transmitted by the user plane processing unit 12-1.

The monitoring unit 36 of the network device 30 determines whether a retransmission finish condition has been met (step S116). If the retransmission finish condition has not been met (step S116: No), the monitoring unit 36 retransmits the test data to the user plane processing unit 12-1 from which the response signal was not received (step S117). The retransmission finish condition indicates that no response signal corresponding to the test data was received during a fixed time period or that the response signal was not received a fixed number of times.

If the retransmission finish condition is met (step S116: Yes), the communication control unit 37 updates the failure management table based on the monitoring result, that is, based on the states of the control plane processing unit 11 and the user plane processing units 12-1 and 12-2 (that is, normal or abnormal (failure)) (step S118).

The control plane processing unit 11 in the network device 10-1 outputs the test data to the user plane processing units 12-1 and 12-2 when the fixed time period from the completion of the previous monitoring processing period has elapsed (step S119, S120).

Consequently, the user plane processing unit 12-2 of the network device 10-1 outputs the response signal to the control plane processing unit 11 (step S121). Since a defect has occurred in the user plane processing unit 12-1 as described above, no response signal is transmitted by the user plane processing unit 12-1.

The control plane processing unit 11 in the network device 10-1 determines whether the retransmission finish condition has been met (step S122). If the retransmission finish condition has not been met (step S122: No), the control plane processing unit 11 outputs the test data again to the user plane processing unit 12-1 from which the response signal was not received (step S123). The retransmission finish condition indicates that no response signal corresponding to the test data was received during a fixed time period or that the response signal was not received a fixed number of times.

If the retransmission finish condition is met (step S122: Yes), the control plane processing unit 11 in the network device 10-1 detects that a defect such as a failure has occurred in the user plane processing unit 12-1 (step S124).

The control plane processing unit 11 in the network device 10-1 transmits the aforementioned partial failure notification to the network device 50 (step S125).

The network device 50 receives the partial failure notification transmitted by the network device 10-1 and updates the failure management table based on the partial failure notification (step S126).

At this time, the network device 30 receives user data from an external network (step S127).

Upon receiving the user data from the receiving unit 31, the communication control unit 37 in the network device 30 specifies the user plane processing unit 12 in which the session with a user terminal 90 is established based on the address of the user terminal 90 and based on the session information management table.

The communication control unit 37 then determines whether or not the specified user plane processing unit 12 is in a failed state based on the specified user plane processing unit 12 and the failure management table (step S128).

When the specified user plane processing unit is in a failed state (step S128: Yes), the communication control unit 37 creates the user data notification. The communication control unit 37 transmits the created user data notification to the network device 50 through the network device 10-2 other than the network device 10-1 in which the session corresponding to the user terminal 90 that is the destination of the user data is established (steps S129, S130).

When the specified user plane processing unit 12 is not in the failed state (step S128: No), the communication control unit 37 transmits the user data temporarily held in the buffer 32 to the base station 70 through the user plane processing unit 12 (steps S131, 132). The base station 70 wirelessly transmits the user data to the user terminal 90.

Upon receiving the user data notification transmitted in step S130, the communication control unit 53 in the network device 50 specifies the control plane processing unit 11 corresponding to the user terminal 90 based on the address of the user terminal 90 included in the user data notification and based on the session information management table. The communication control unit 53 then determines whether the network device 10-1 in which the specified control plane processing unit 11 is installed is partially failed based on the specified control plane processing unit 11 and the failure management table (step S133).

When it is determined that a total failure is present (step S133: No), the communication control unit 53 transmits the session creation request to the network device 10-3 other than the network device 10-1 (step S134). After the session is created, the network device 10-3 creates the switch request notification and transmits the switch request notification to the network device 30.

If the communication control unit 53 determines that a partial failure has occurred (step S133: Yes), the wireless segment setting processing unit 52 cooperates with the user terminal 90 and the base station 70 to execute the wireless segment setting process (step S135).

The communication control unit 53 transmits the change request for the session with the user terminal 90 to the network device 10-1 (step S136).

Upon receiving the change request, the communication control unit 19 in the network device 10-1 newly establishes (moves) the session corresponding to the change request to the other user plane processing unit 12-2 that is different from the user plane processing unit 12-1 in which the session is currently established (step S137).

The communication control unit 19 then transmits an address notification pertaining to the user plane processing unit 12-2 to the base station 70 through the network device 50 (steps S140, S141).

The path switch request notification unit 21 receives the correspondence relation of the newly established session and the communication tunnel of the user plane processing unit 12 from the communication control unit 19, and then creates the switch request notification including the correspondence relation and transmits the switch request notification to the network device 30 (step S138).

The communication control unit 37 updates the session information management table based on the switch request notification (step S139).

The communication control unit 37 transmits the user data temporarily held in the buffer 32 to the base station 70 through the user plane processing unit 12-2 indicated in the switch request notification (steps S142, 143).

(Modified Example)

Figure 14:
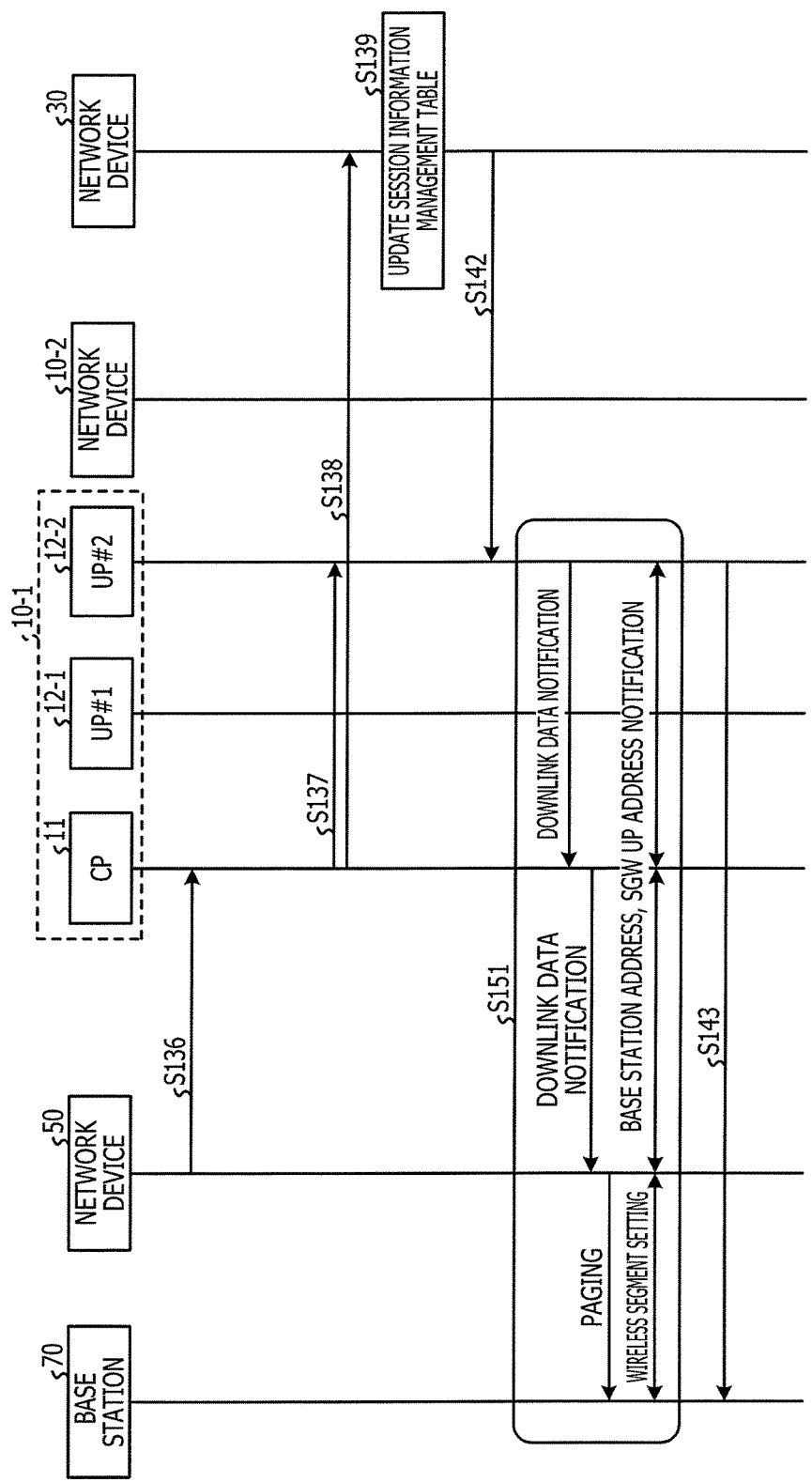
FIG. 14 is a modified example of the processing operations in FIG. 13.

While the session creation request is transmitted to the network device 10-1 after the network device 50 has executed the wireless segment setting process in FIG. 13, the session creation request may be sent to the network device 10-1 before the execution of the wireless segment setting process. FIG. 14 is a modified example of the processing operations in FIG. 13.

When the user plane processing unit 12-2 in the network device 10-1 receives the user data, the communication control unit 19 transmits a downlink data notification to the network device 50 in FIG. 14. The network device 10-1, the network device 50, and the base station 70 cooperate to execute the wireless segment setting process (step S151).

(Transferring Uplink User Data)

Figure 15:
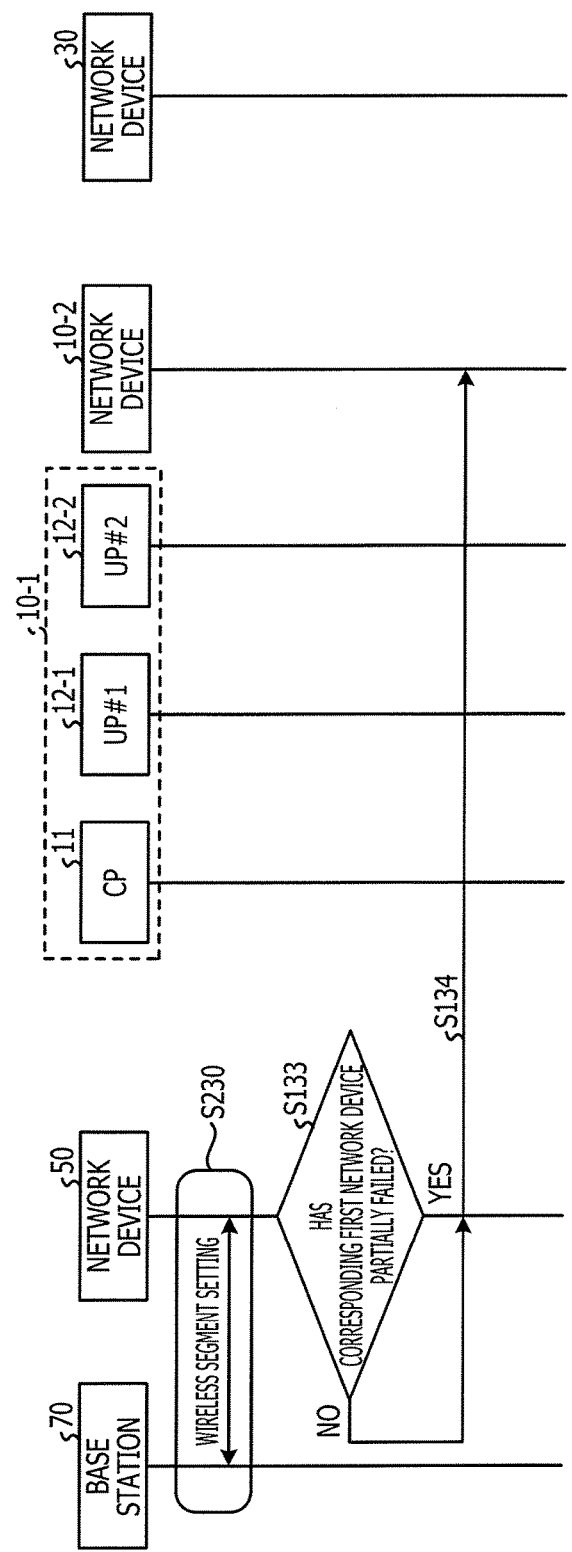
FIG. 15 is a view for explaining processing operations of a communication system of the first embodiment.
Figure 16:
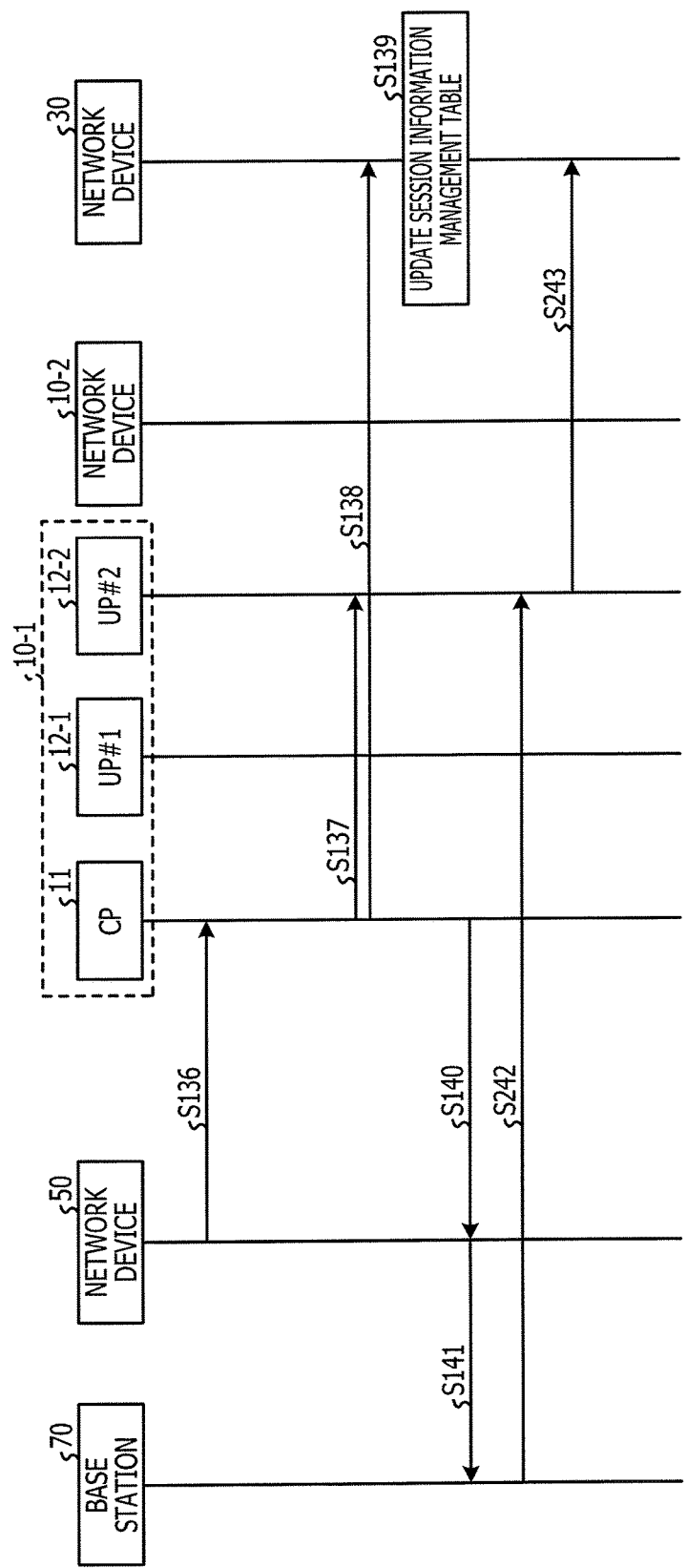
FIG. 16 illustrates processing operations continued from FIG. 15.

FIG. 15 is an example for explaining processing operations of a communication system of the first embodiment. FIG. 16 illustrates processing operations continued from FIG. 15. When uplink user data is transferred, the processing operations in steps S101 to S127 in FIGS. 11 and 12 are executed before the processing operations in FIG. 15.

When no wireless segment for the user terminal 90 to transmit uplink user data is set, the wireless segment setting processing unit 52 in the network device 50 cooperates with the base station 70 to execute the wireless segment setting processing (step S230).

The base station 70 transmits the uplink user data to the network device 30 through the user plane processing unit 12-2 in the network device 10-1 (steps S242, S243).

According to the above embodiment, the monitoring unit 36 in the network device 30 monitors in units of processing units whether any defects are present in the control plane processing unit 11 and in the plurality of user plane processing units 12 in the network device 10. When a first session for the user terminal 90 that is the destination of the user data is set in a user plane processing unit 12, the communication control unit 37 then transfers the user data to the user plane processing unit 12.

Due to the configuration of the network device 30, no session is established wastefully in another network device 10, and the wasteful use of resources can be reduced since an available session is used. That is, the utilization efficiency of the resources can be improved.

When the first session with the user terminal 90 that is the destination of the user data is set in the user plane processing unit 12, the communication control unit 37 transmits the user data notification to the network device 50 through another network device 10. A change request for the session with respect to the network device 50 is transmitted to the control plane processing unit 11 upon receiving the user data notification. The first session with respect to the control plane processing unit 11 is then set to the user plane processing unit 12 that has no defect.

According to the configuration of the network device 30, no wasteful session is established in another network device 10, and a session can be established in a user plane processing unit 12 without a defect among the network devices 10 in which a defect is present in a portion of the user plane processing units 12. Therefore, the wasteful use of resources can be reduced since the establishment of the same sessions with the user terminal 90 are not duplicated in a plurality of network devices 10. That is, the utilization efficiency of the resources can be improved.

When the communication control unit 53 in the network device 50 receives the user data notification from the network device 30 through another network device 10 and receives the partial failure notification from the network device 10, the change request for the session with the user terminal 90 is transmitted to the control plane processing unit 11 of the network device 10.

According to the configuration of the network device 50, no wasteful session is established in another network device 10, and a session can be established in a user plane processing unit 12 without a defect among the network devices 10 in which a defect is present in a portion of the user plane processing units 12. Therefore, a wasteful use of resources can be reduced since the establishment of the same sessions with the user terminal 90 is not duplicated in a plurality of network devices 10. That is, the utilization efficiency of the resources can be improved.

(Second Embodiment)

(Outline of Communication System)

Figure 17:
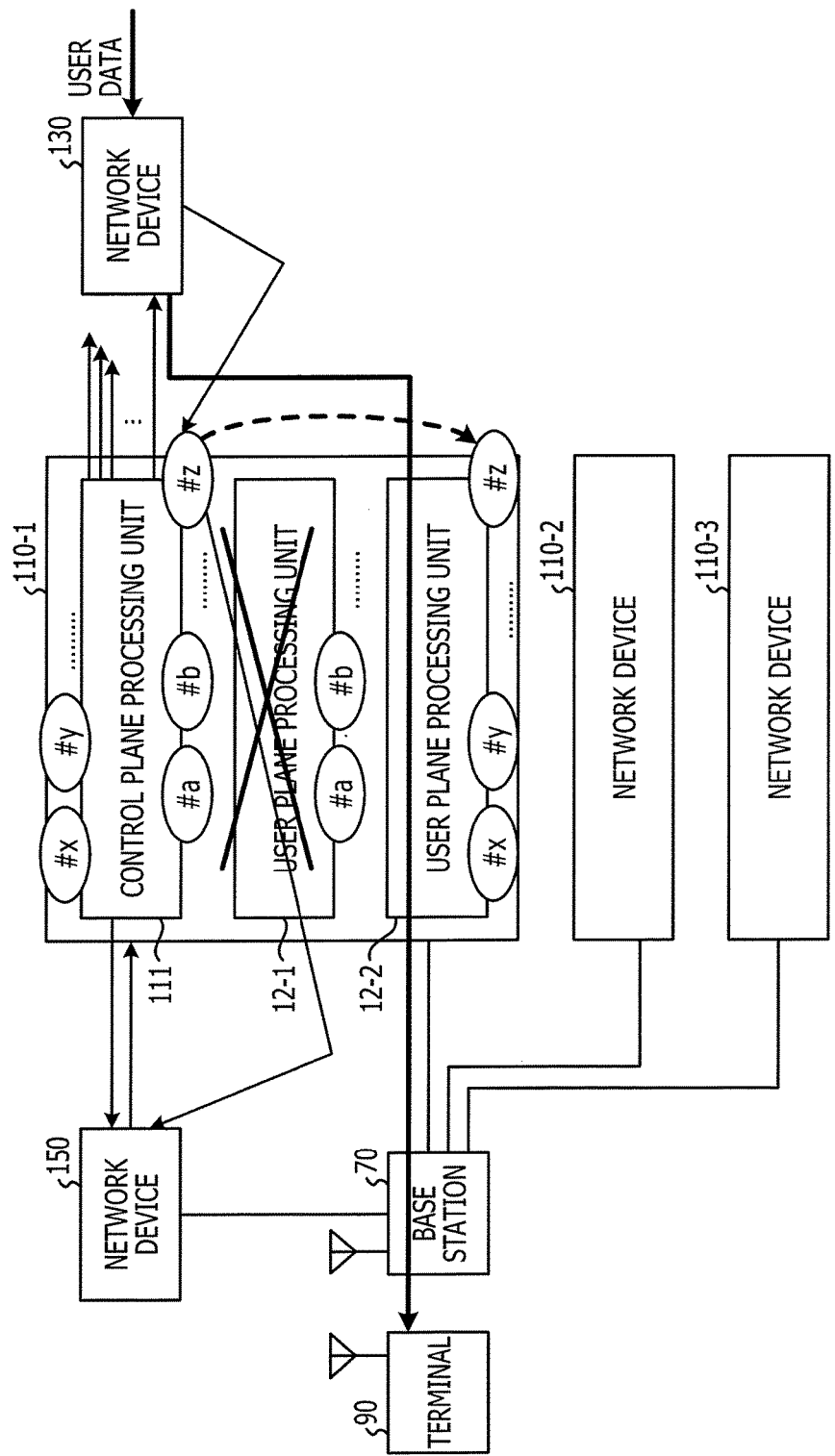
FIG. 17 is an example of a communication system of a second embodiment.

FIG. 17 is an example of a communication system of a second embodiment. A communication system 2 illustrated in FIG. 17 has network devices 110-1, 110-2, 110-3, a network device 130, a network device 150, the base station 70, and the user terminal 90. The network device 110 is for example a SGW, the network device 130 is for example a PGW, and the network device 150 is for example a MME or a SGSN. While the number of network devices 110 is three, the number of network devices 130 is one, the number of one network devices 150 is one, and the number of base stations 70 and user terminals 90 is one each in FIG. 17, the number of each of the constituents is not limited. Furthermore, the network device 110 may be referred to as a "first network device", the network device 130 may be referred to as a "second network device", and the network device 150 may be referred to as a "third network device" hereinbelow.

The network device 110-1 in FIG. 17 has a control plane processing unit 111. The network devices 110-2 and 110-3 have the same configuration as the network device 110-1.

The network devices 110, the network device 130, and the network device 150 basically have the same functions respectively as the network devices 10, the network device 30, and the network device 50 in the first embodiment.

However, the following points differ mainly from the first embodiment. That is, when a defect is present in the user plane processing unit 12 in which a session with the user terminal 90 is established, the network device 130 transmits the user data notification to the control plane processing unit 111 of the network device 110-1.

Upon receiving the user data notification, the control plane processing unit 111 of the network device 110-1 establishes a session with the user terminal 90 in the user plane processing unit 12-2 that is different from the user plane processing unit 12-1 and that does not have a defect.

The control plane processing unit 111 of the network device 110-1 transmits the user data notification to the network device 150. As a result, the network device 150 is able to obtain the user data notification through the control plane processing unit 111 of the network device 110-1.

As described above, the establishment processing of the session can be started earlier because the network device 130 transmits the user data notification to the network device 110-1.

(Configuration Example of First Network Device)

Figure 18:
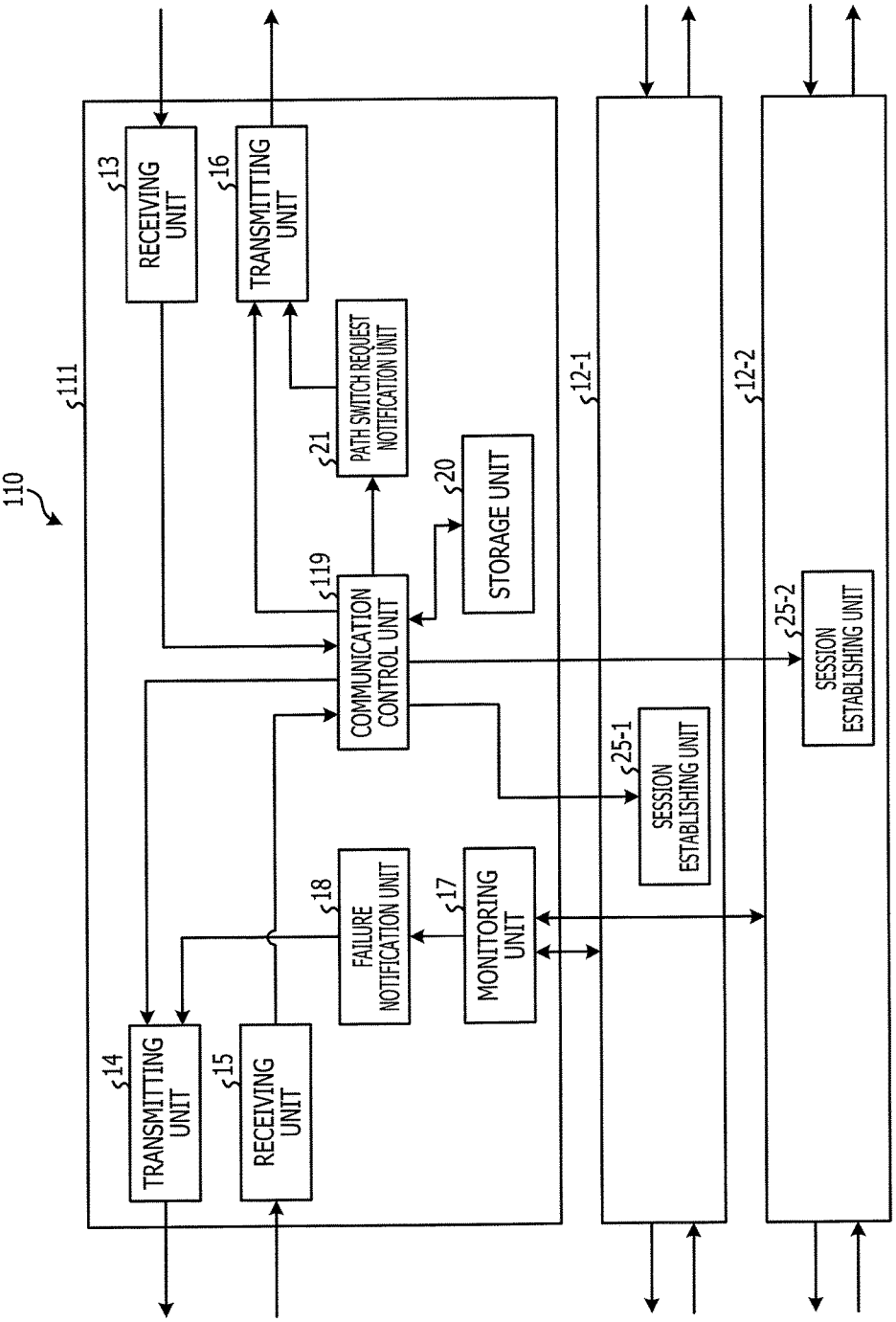
FIG. 18 is a block diagram of an example of a first network device of the second embodiment.

FIG. 18 is a block diagram of an example of a first network device of the second embodiment. The network device 110 in FIG. 18 has the control plane processing unit 111. The control plane processing unit 11 has a communication control unit 119.

Upon receiving the user data notification, the communication control unit 119 newly establishes (moves) the session corresponding to the user data notification to another user plane processing unit 12 that is different from the user plane processing unit 12 in which the session is currently established. Upon receiving the user data notification, the communication control unit 119 transmits the user data notification to the network device 150 through the transmitting unit 14.

Upon receiving a "base station address notification" through the receiving unit 15, the communication control unit 119 copies the base station address indicated in the base station address notification into the session correspondence table.

(Configuration Example of Second Network Device)

Figure 19:
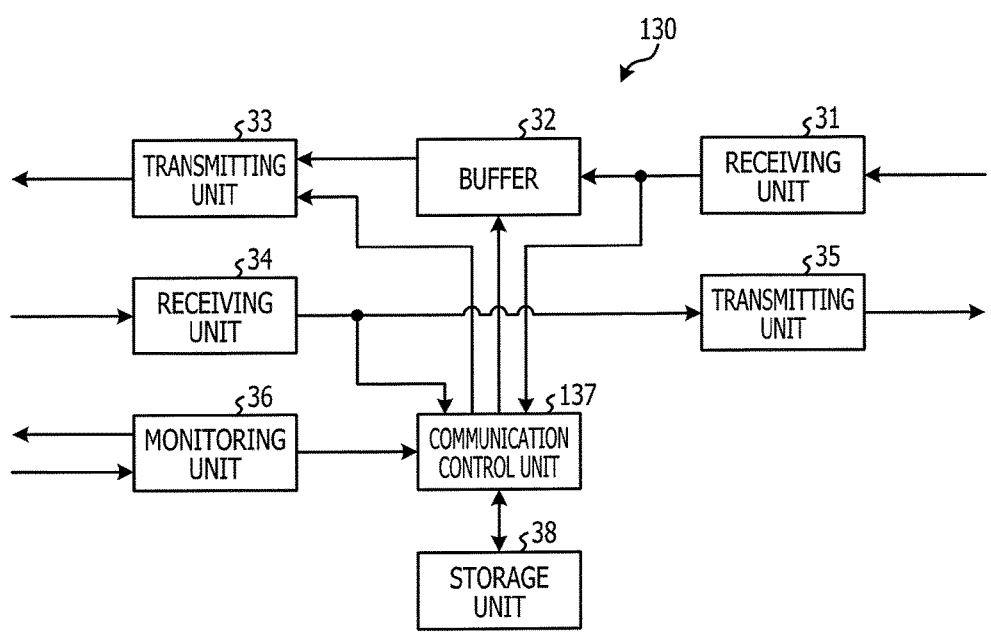
FIG. 19 is a block diagram of an example of a second network device of the second embodiment.

FIG. 19 is a block diagram of an example of a second network device of the second embodiment. The network device 130 in FIG. 19 has a communication control unit 137.

If the specified user plane processing unit 12 is in a failed state, the communication control unit 137 creates the user data notification. The communication control unit 137 then outputs the created user data notification to the transmitting unit 33, and the user data notification is transmitted to the control plane processing unit 111 of the network device 110 in which the session corresponding to the user terminal 90 that is the destination of the user data is established.

(Configuration Example of Third Network Device)

Figure 20:
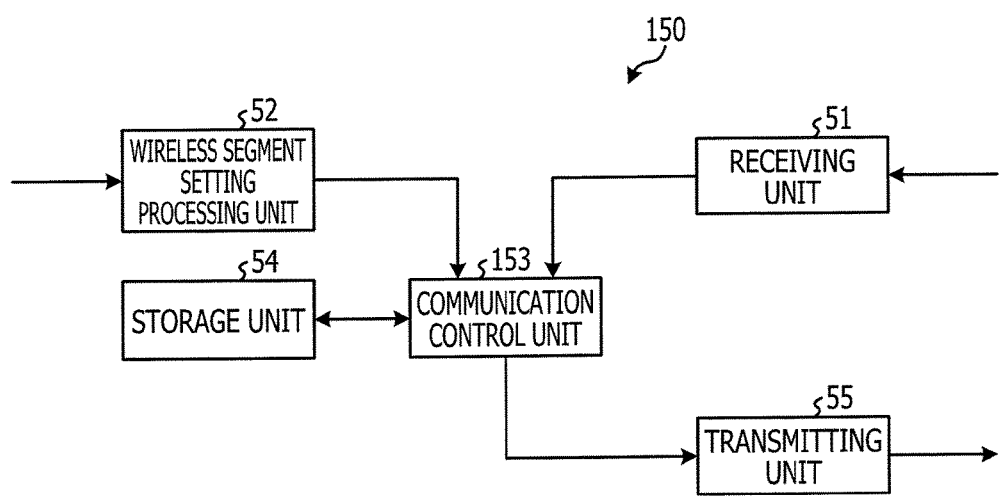
FIG. 20 is a block diagram of an example of a third network device of the second embodiment.

FIG. 20 is a block diagram of an example of a third network device of the second embodiment. The network device 150 in FIG. 20 has the communication control unit 153.

Upon receiving the partial failure notification and the user data notification, the communication control unit 153 transmits the aforementioned base station address notification to the network device 110. For example, the communication control unit 153 specifies the control plane processing unit 111 corresponding to the user terminal 90 based on identification information (for example, an address) of the user terminal 90 included in the user data notification and the session information management table. The communication control unit 153 then determines whether a failure is present in the user plane processing unit 12 that manages the specified control plane processing unit 111 based on the specified control plane processing unit 111 and the failure management table. When a partial failure is present in the user plane processing unit 12 that is managed by the specified control plane processing unit 111, the communication control unit 153 then transmits to the network device 10 the base station address notification for notifying the address of the base station 70 overseeing the user terminal 90.

(Operation Example of Communication System)

Figure 21:
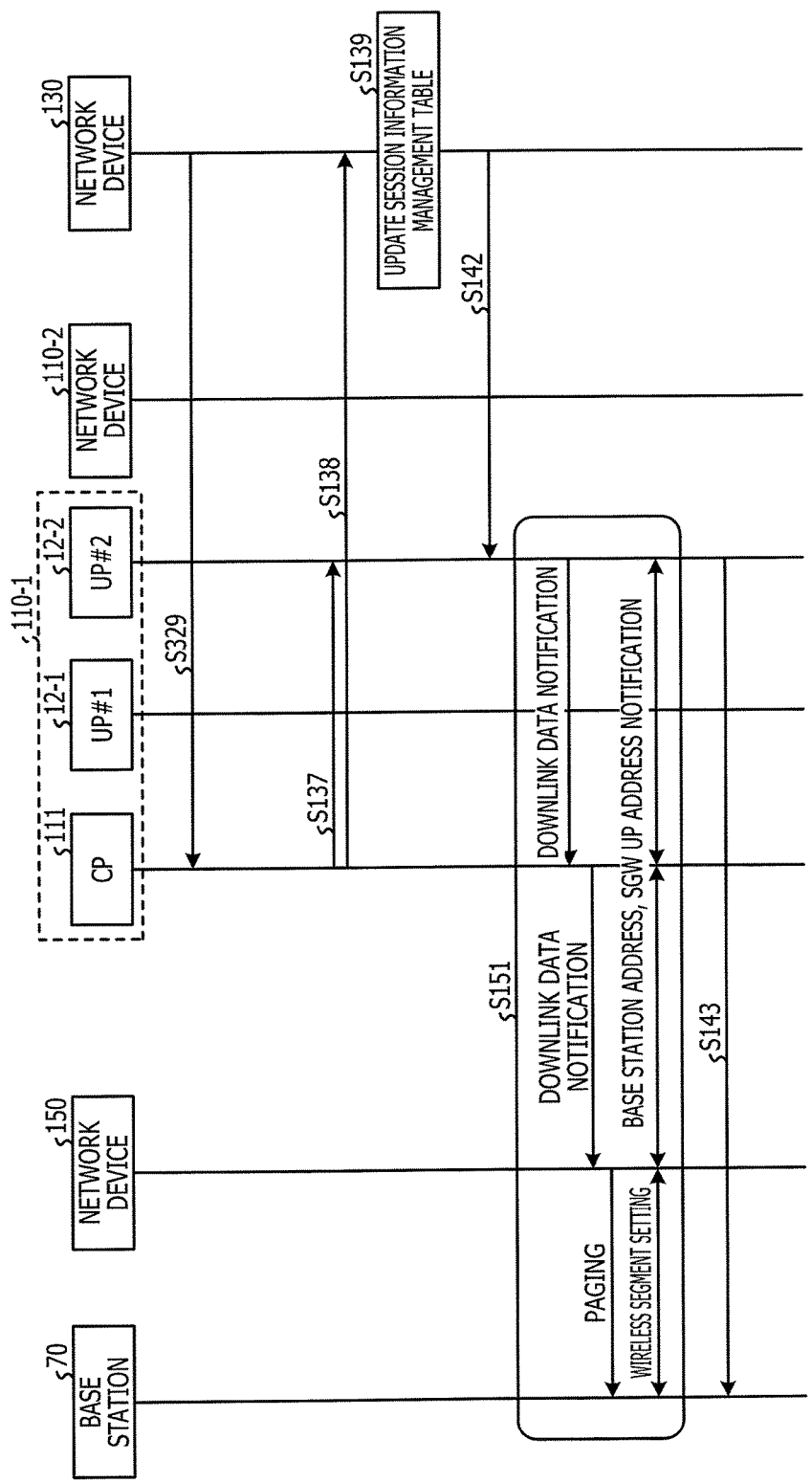
FIG. 21 is a view for explaining processing operations of a communication system of the second embodiment.

An example of processing operations in the communication system 2 having the above configurations is described below. FIG. 21 is a view for explaining processing operations of the communication system of the second embodiment. The processing operations of the second embodiment are the same as the processing operations from step S101 to step S128 in FIGS. 11 and 12 and the processing operations when step S128 is determined as "No". The processing operations thereafter of the second embodiment are described in FIG. 21.

That is, when the specified user plane processing unit 12 is in a failed state (step S128: Yes), the communication control unit 137 creates the user data notification. The communication control unit 137 transmits the created user data notification to the control plane processing unit 111 of the network device 110-1 in which the session corresponding to the user terminal 90 that is the destination of the user data is established (step S329).

(Modified Example)

Figure 22:
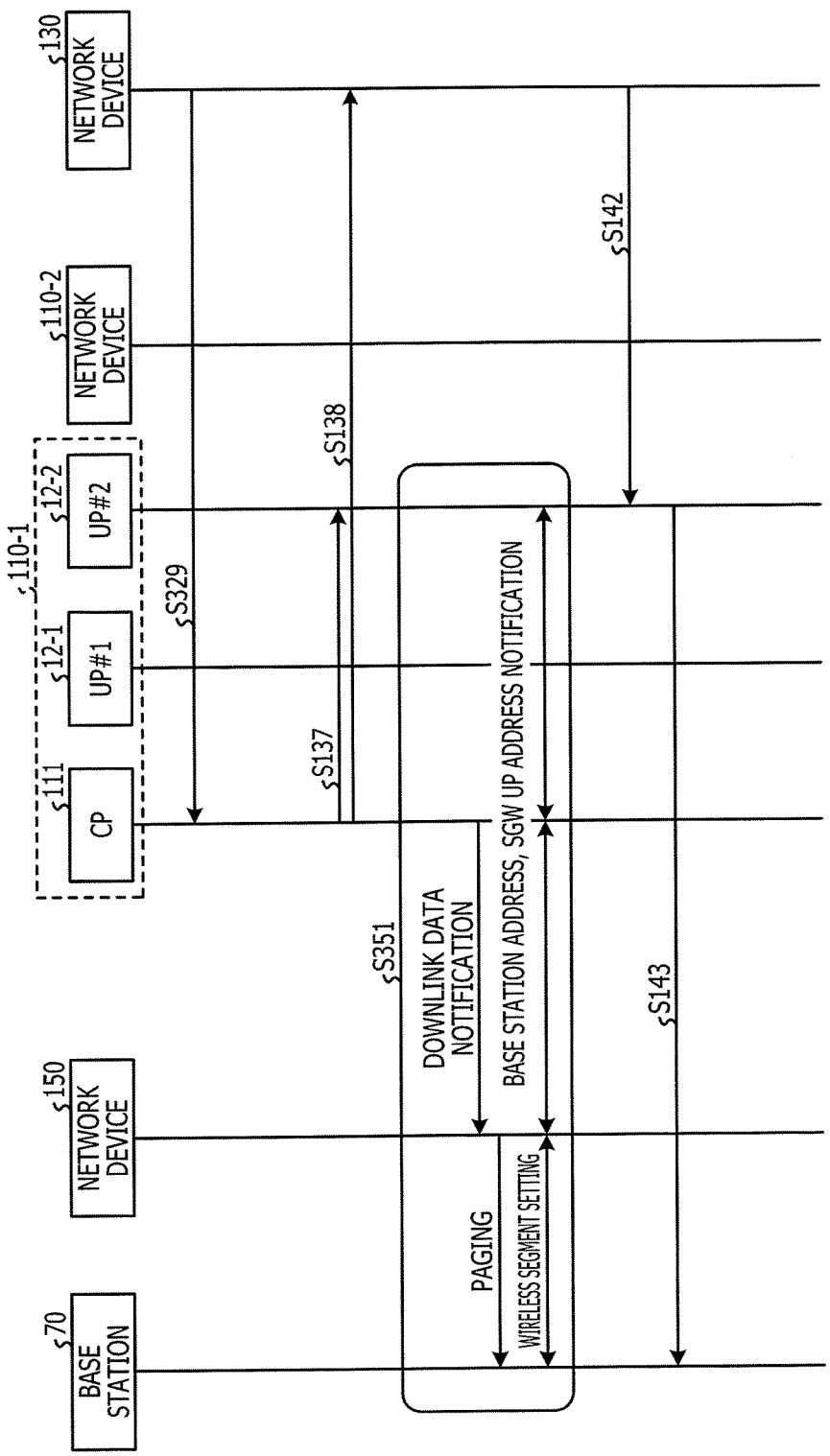
FIG. 22 is a modified example of the processing operations in FIG. 21.

While the downlink data notification is transmitted after the user plane processing unit 12-2 actually receives the user data in FIG. 21, the downlink data notification may be transmitted beforehand. FIG. 22 is a modified example of the processing operations in FIG. 21.

The network device 110-1 receives the user data notification and then transmits the user data notification to the network device 150 without waiting for the reception of the user data. The network device 110-1, the network device 150, and the base station 70 cooperate to execute the wireless segment setting processing (step S351).

According to the present embodiments described above, when the first session with the user terminal 90 that is the destination of the user data is set in the user plane processing unit 12 having a defect, the communication control unit 137 in the network device 130 sets the first session with the control plane processing unit 11 in the user plane processing unit 12 not having a defect by transmitting the user data notification to the control plane processing unit 111.

According to the configuration of the network device 130, no wasteful session is established in another network device 110, and a session can be established in a user plane processing unit 12 without a defect within the network device 110 in which a defect is present in a portion of the user plane processing units 12. Therefore, the wasteful use of resources can be reduced since the establishment of the same session with the user terminal 90 is not duplicated in a plurality of network devices 110. That is, the utilization efficiency of the resources can be improved.

(Third Embodiment)

The first network device changes the session upon receiving the change request or the user data notification in the first and second embodiments. Accordingly, the processing to change the session is started when the control plane processing unit in the first network device detects a failure in a user plane processing unit in the third embodiment. This processing method is described using the example provided in the first embodiment. The configuration of the communication system in the third embodiment has elements in common with the communication system 1 in the first embodiment and the communication system 2 in the second embodiment. Therefore, FIGS. 4, 5, and 8 will be used in the following explanation.

Figure 23:
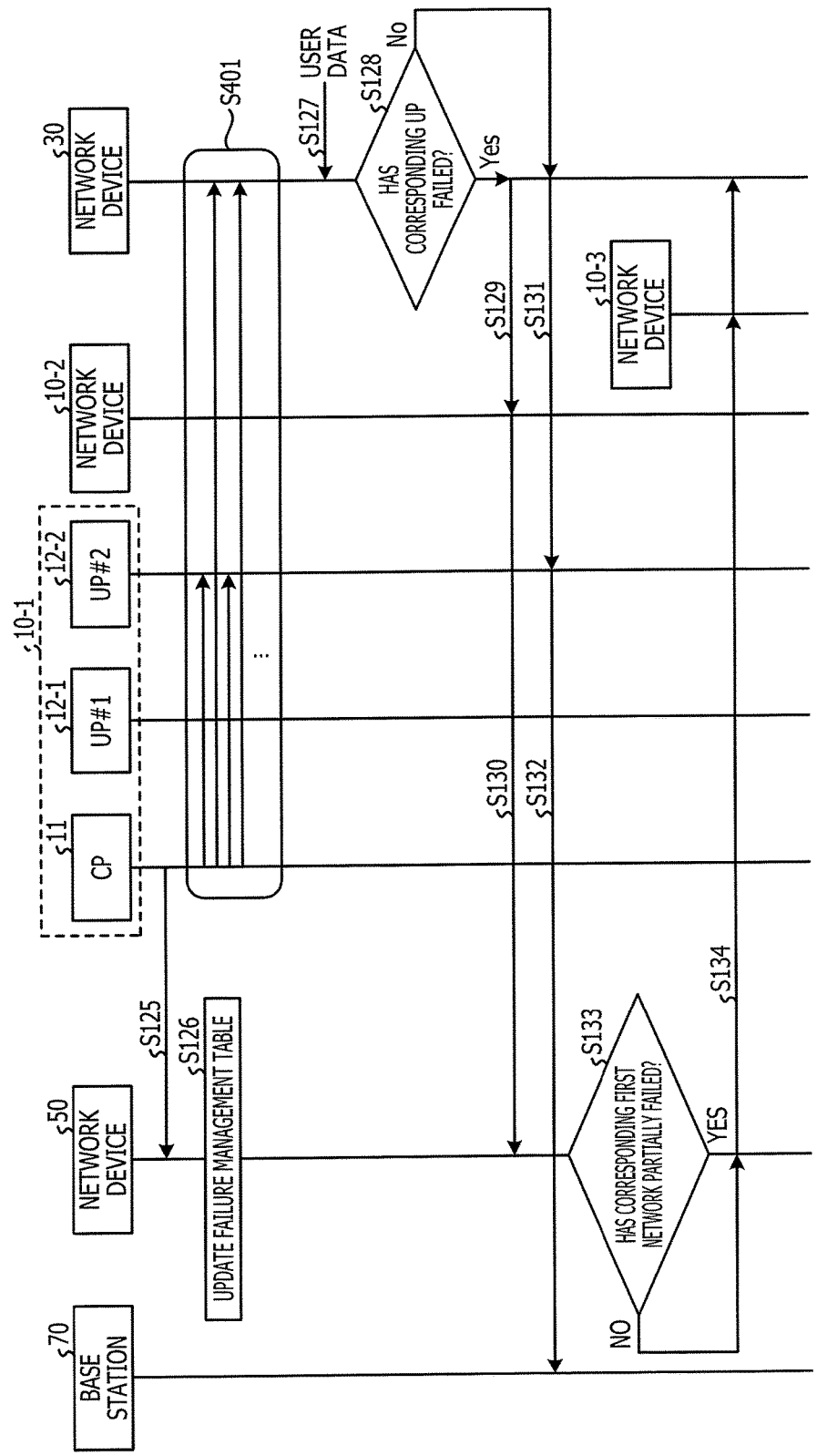
FIG. 23 is a view for explaining processing operations of a communication system of a third embodiment.

FIG. 23 is a view for explaining processing operations of a communication system of the third embodiment.

When the occurrence of a defect such as a failure is detected in the user plane processing unit 12-1, the control plane processing unit 11 starts processing (change processing) to establish the session established in the user plane processing unit 12-1 in the normal user plane processing unit 12-2. At the same time, the control plane processing unit 11 creates the switch request notification and transmits the switch request notification to the network device 30 (step S401). When a multitude of switch request notifications are transmitted at one time to the network device 30, there is a concern that the network device 30 may become congested. As a result, the executions of the change processing and the transmissions of the switch request notification are conducted in sequence at timings offset from the sessions. Therefore, when a multitude of sessions are established in the user plane processing unit 12 having the defect, there is a possibility that the change processing may take too much time.

Upon receiving the change request for the session with the user terminal 90 from the network device 50 based on processing the same as that of the first embodiment and when the change of the session is not yet completed, the control plane processing unit 11 prioritizes the change processing of another session and then changes that session.

According to the present embodiment as described above, the control plane processing unit 11 in the network device 10 receives the change request for the session with the user terminal 90 from the network device 50 and then prioritizes the change processing of another session and changes that session.

According to the configuration of the network device 10, the session for the destination in the user data transmitted previously can be established earlier.

(Other Embodiments)

The constituent elements of the illustrated parts in the first to third embodiments do not have to be configured physically as illustrated. In other words, the embodiments are not limited to the particular forms of distribution and integration of each part and all or some of the parts may be configured to be functionally or physically distributed or integrated in arbitrary units according to the type of load or usage conditions and the like.

Furthermore, various processing functions conducted by the devices may be executed in part or in total on a central processing unit (CPU) or a micro-computer such as a micro processing unit (MPU) or a micro controller unit (MCU) and the like. Moreover, various processing functions may also be conducted in part or in total on a program that conducts analysis with the CPU (or a micro-computer such as an MPU or MCU), or on hardware based on wired logic.

The first network device, the second network device, and the third network device on the first to third embodiments may be realized by the following hardware configuration.

Figure 24:
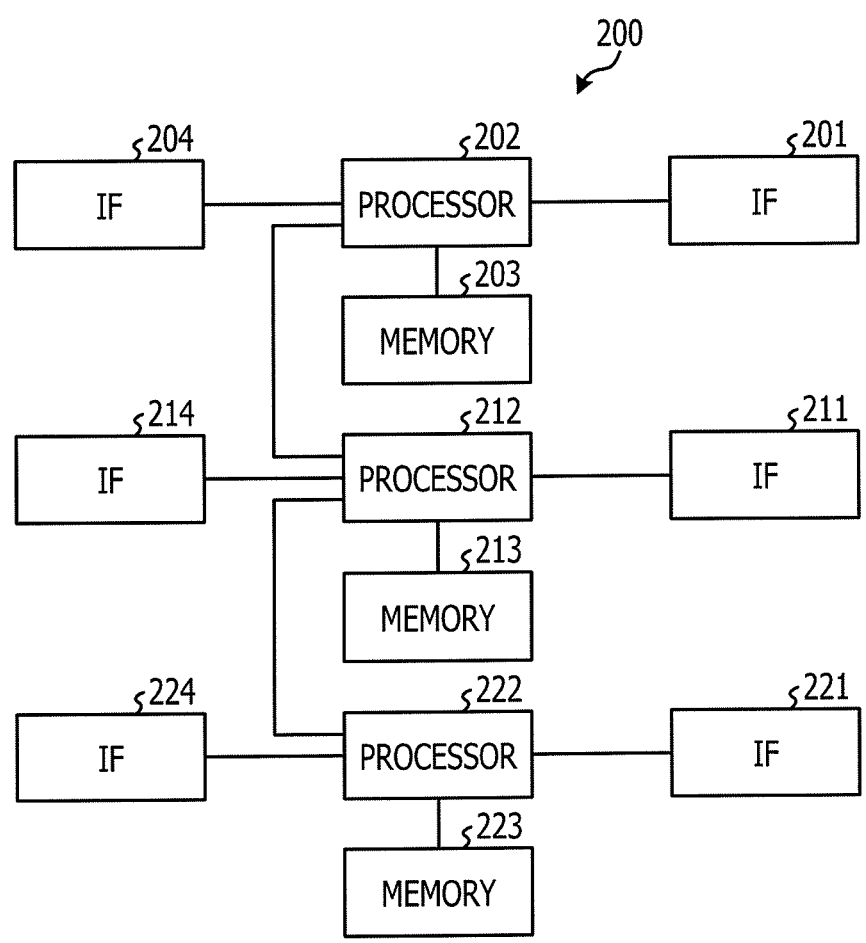
FIG. 24 illustrates a hardware configuration example of the first network device.

FIG. 24 illustrates a hardware configuration example of the first network device. As illustrated in FIG. 24, a first network device 200 has interfaces (IF) 201, 204, 211, 214, 221, and 224, processors 202, 212, and 222, and memories 203, 213, and 223. A CPU, a digital signal processor (DSP), or a field programmable gate array (FPGA) may be considered as examples of the processors 202, 212, or 222. A random access memory (RAM) such as a synchronous dynamic random access memory (SDRAM), a read-only memory (ROM, or a flash memory may be considered as examples of the memories 203, 213, or 223. The network devices 10 and 110 described in the first to third embodiments have the hardware configuration illustrated in FIG. 24.

The various processing functions conducted by the first network device in the first to third embodiments may be realized by the processors provided in the first network device executing programs stored in various types of memories such as a non-volatile storage medium.

That is, programs corresponding to the processing executed by the monitoring unit 17, the failure notification unit 18, the communication control units 19 and 119, and the path switch request notification unit 21, may be recorded in the memory 203 and the programs may be executed by the processor 202. Moreover, the receiving units 13 and 15 and the transmitting units 14 and 16 may be realized by the IFs 201 and 204. The storage unit 20 may be realized by the memory 203.

Programs corresponding to the processing executed by the session establishing unit 25-1 may be recorded in the memory 213 and the programs may be executed by the processor 212. Programs corresponding to the processing executed by the session establishing unit 25-2 may be recorded in the memory 223 and the programs may be executed by the processor 222.

Figure 25:
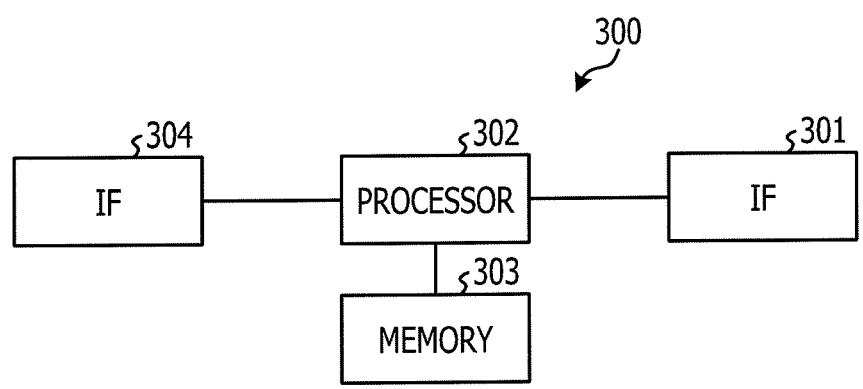
FIG. 25 illustrates a hardware configuration example of the second network device.

FIG. 25 illustrates a hardware configuration example of the second network device. As illustrated in FIG. 25, a second network device 300 has IFs 301 and 304, a processor 302, and a memory 303. A CPU, a DSP, and a FPGA may be considered as examples of the processor 302. A RAM such as a SDRAM, a ROM, or a flash memory may be considered as examples of the memory 303. The network devices 30 and 130 described in the first to third embodiments have the hardware configuration illustrated in FIG. 25.

The various processing functions conducted by the second network device in the first to third embodiments may be realized by the processor provided in the second network device executing programs stored in various types of memories such as a non-volatile storage medium.

That is, programs corresponding to the processing executed by the monitoring unit 36 and the communication control units 37 and 137 may be recorded in the memory 303 and the programs may be executed by the processor 302. The receiving units 31 and 34 and the transmitting units 33 and 35 may be realized by the IFs 301 and 304. The buffer 32 and the storage unit 38 may be realized by the memory 303.

Figure 26:
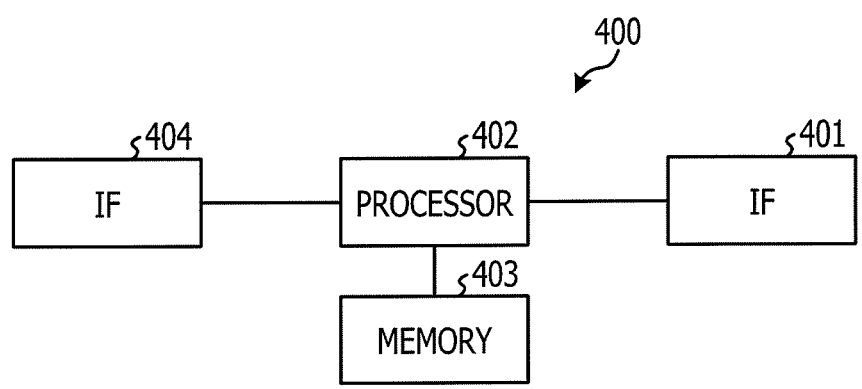
FIG. 26 illustrates a hardware configuration example of the third network device.

FIG. 26 illustrates a hardware configuration example of the third network device. As illustrated in FIG. 26, a third network device 400 has IFs 401 and 404, a processor 402, and a memory 403. A CPU, a DSP, and a FPGA may be considered as examples of the processor 402. A RAM such as a SDRAM, a ROM, or a flash memory may be considered as examples of the memory 403. The network devices 50 and 150 described in the first to third embodiments have the hardware configuration illustrated in FIG. 26.

The various processing functions conducted by the third network device in the first to third embodiments may be realized by the processor provided in the third network device executing programs stored in various types of memories such as a non-volatile storage medium.

That is, programs corresponding to the processing executed by the wireless segment setting processing unit 52 and the communication control units 53 and 153 may be recorded in the memory 403 and the programs may be executed by the processor 402. The receiving unit 51 and the transmitting unit 55 may be realized by the IFs 401 and 404. The storage unit 54 may be realized by the memory 403.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system for wireless communication comprising:
a first communication apparatus including:
a plurality of user plane processors, each user plane processor of the plurality of user plane processors being configured to forward data associated with a session that is associated with the user plane processor, to a terminal or from the terminal,
a control plane processor configured to:
determine whether each of the plurality of user plane processors is available by monitoring for defects in each of the plurality of user plane processors,
transfer, when a first user plane processor is unavailable, the session that has been associated with the first user plane processor to a second user plane processor that is available, and
transmit a first signal to a third communication apparatus when the first user plane processor is unavailable,
wherein the third communication apparatus is configured to switch a logical channel that is associated with the session for transmitting the data based on the first signal, and
wherein a second communication apparatus configured to:
forward the data to an external network or from the external network, and
determine whether each of the plurality of user plane processors is available.

2. The system for wireless communication according to claim 1, wherein
the second communication apparatus is configured to transmit a second signal to the third communication apparatus via another first communication apparatus, when the second communication apparatus detects data to the terminal and the first user plane processor is unavailable.

3. The system for wireless communication according to claim 2, wherein
the third communication apparatus is configured to transmit a third signal that indicates to transfer the session to the second user plane processor in response to receiving the first signal and the second signal.

4. The system for wireless communication according to claim 1, wherein
the third communication apparatus is configured to transmit a third signal that indicates to transfer the session to the second user plane processor in response to receiving the first signal and detecting the data from the terminal.

5. The system for wireless communication according to claim 1, wherein
the second communication apparatus is configured to transmit a second signal to the control plane processor, when the second communication apparatus detects data to the terminal and the first user plane processor is unavailable.

6. The system for wireless communication according to claim 5, wherein the control plane processor is further configured to transmit the second signal to the third communication apparatus.

7. The system for wireless communication according to claim 1,
wherein the control plane processor is further configured to transmit a fourth signal to the second communication apparatus when the first user plane processor is unavailable.

8. The system for wireless communication according to claim 1, wherein
a user plane processor is unavailable when the user plane processor is monitored as being in an abnormal state.

9. The system for wireless communication according to claim 1, wherein
a user plane processor is unavailable when a failure occurs in the user plane processor as monitored by the control plane processor.

10. A first communication apparatus for wireless communication comprising:
a plurality of user plane processors, each user plane processor of the plurality of user plane processors being configured to forward data associated with a session that is associated with the user plane processor, to a terminal or from the terminal; and a control plane processor configured to:
 determine whether each of the plurality of user plane processors is available by monitoring for defects in each of the plurality of user plane processors,
 transfer, when a first user plane processor is unavailable, the session that has been associated with the first user plane processor to a second user plane processor that is available, and
 transmit a first signal to a third communication apparatus when the first user plane processor is unavailable, wherein the first signal causes the third communication apparatus to switch a logical channel that is associated with the session for transmitting the data based on the first signal, and wherein the first communication apparatus is in communication with a second communication apparatus, and configured to:
 forward the data to an external network or from the external network, and
 determine whether each of the plurality of user plane processors is available.

11. A first communication apparatus for wireless communication comprising:
a memory; and
a processor configured to:
 forward data from an external network to a second communication apparatus or from the second communication apparatus to the external network, the second communication apparatus including a plurality of user plane processors and a control plane processor, each user plane processor of the plurality of user plane processors being configured to forward the data associated with a session that is associated with the user plane processor, to a terminal or from the terminal, and
 determine whether each of the plurality of user plane processors is available, and the control plane processor being configured to:
 determine whether each of the plurality of user plane processors is available by monitoring for defects in each of the plurality of user plane processors,
 transfer, when a first user plane processor is unavailable, the session that has been associated with the first user plane processor to a second user plane processor that is available; and
 transmit a first signal to the third communication apparatus when the first user plane processor is unavailable, and wherein the third communication apparatus is configured to switch a logical channel that is associated with the session for transmitting the data based on the first signal.

* * * * *